(12) United States Patent
Becker

(10) Patent No.: US 12,125,263 B2
(45) Date of Patent: Oct. 22, 2024

(54) OBJECT DETECTION APPARATUS, SYSTEM AND METHOD USING FEATURE MAPS TRANSFORMED INTO A TEMPLATE COORDINATE SYSTEM

(71) Applicant: Sony Group Corporation, Tokyo (JP)

(72) Inventor: Florian Becker, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 424 days.

(21) Appl. No.: 17/424,913

(22) PCT Filed: Jan. 29, 2020

(86) PCT No.: PCT/EP2020/052174
§ 371 (c)(1),
(2) Date: Jul. 22, 2021

(87) PCT Pub. No.: WO2020/157138
PCT Pub. Date: Aug. 6, 2020

(65) Prior Publication Data
US 2022/0108544 A1    Apr. 7, 2022

(30) Foreign Application Priority Data
Jan. 30, 2019 (EP) .................................... 19154616

(51) Int. Cl.
*G06K 9/00* (2022.01)
*G06T 7/73* (2017.01)
(Continued)

(52) U.S. Cl.
CPC ............ *G06V 10/7715* (2022.01); *G06T 7/73* (2017.01); *G06V 10/751* (2022.01);
(Continued)

(58) Field of Classification Search
CPC ............ G06V 10/7715; G06V 10/751; G06V 10/761; G06V 10/806; G06V 20/56;
(Continued)

(56) References Cited

U.S. PATENT DOCUMENTS 6,697,538 B1    2/2004 Angenent et al.
9,464,894 B2   10/2016 Napier et al.
(Continued)

FOREIGN PATENT DOCUMENTS

| EP | 0345912 A2 | 12/1989 |
|---|---|---|
| WO | 2011/160672 A1 | 12/2011 |
| WO | 2018/220048 A1 | 12/2018 |

OTHER PUBLICATIONS

Song and Xiao, "Deep Sliding Shapes for Amodal 3D Object Detection in RGB-D Images," 2016 IEEE Conference on Computer Vision and Pattern Recognition (CVPR), Las Vegas, NV, USA, 2016, pp. 808-816, doi: 10.1109/CVPR.2016.94 (Year: 2016).*

(Continued)

*Primary Examiner* — Andrew M Moyer
(74) *Attorney, Agent, or Firm* — XSENSUS LLP

(57) ABSTRACT

An object detection apparatus comprises circuitry configured to obtain one or more feature maps of a measurement space generated from sensor data of a scene, the sensor data including position information and a feature map representing feature values of a feature at a plurality of positions in the measurement space, transform the one or more feature maps into a template coordinate system, compute a likelihood that the one or more feature maps correspond to an object template and a given candidate object configuration, and iteratively compute likelihoods for different candidate object configurations and determine the object configuration with the highest likelihood.

20 Claims, 30 Drawing Sheets

(51) Int. Cl.
  *G06V 10/74* (2022.01)
  *G06V 10/75* (2022.01)
  *G06V 10/77* (2022.01)
  *G06V 10/80* (2022.01)
  *G06V 20/56* (2022.01)

(52) U.S. Cl.
  CPC .......... *G06V 10/761* (2022.01); *G06V 10/806* (2022.01); *G06V 20/56* (2022.01); *G06T 2207/20076* (2013.01); *G06T 2207/30252* (2013.01); *G06V 2201/08* (2022.01)

(58) Field of Classification Search
  CPC ...... G06V 2201/08; G06V 20/58; G06T 7/73; G06T 2207/20076; G06T 2207/30252
  See application file for complete search history.

(56) References Cited

U.S. PATENT DOCUMENTS

| | | | |
|---|---|---|---|
| 9,690,977 | B2 | 6/2017 | Szeliski et al. |
| 2009/0028440 | A1* | 1/2009 | Elangovan ............. H04N 5/272 382/103 |
| 2014/0160114 | A1 | 6/2014 | Stevenson et al. |
| 2017/0109644 | A1 | 4/2017 | Nariyambut Murali et al. |
| 2017/0371348 | A1 | 12/2017 | Mou |
| 2018/0165531 | A1* | 6/2018 | Sathyanarayana ..... G06V 20/58 |
| 2018/0365888 | A1* | 12/2018 | Satzoda ............... G05D 1/0251 |

OTHER PUBLICATIONS

Li, Keqiang, et al. "Density enhancement-based long-range pedestrian detection using 3-D range data." IEEE Transactions on Intelligent Transportation Systems 17.5 (2015): 1368-1380. (Year: 2015).*

International Search Report and Written Opinion mailed on Apr. 14, 2020, received for PCT Application PCT/EP2020/052174, Filed on Jan. 29, 2020, 12 pages.

Montemerlo et al., "Junior: The Stanford Entry in the Urban Challenge", Journal of field Robotics, Sep. 1, 2008, 31 pages.

Vu, "Vehicle Perception: Localization, Mapping With Detection, Classification and Tracking of Moving Objects", Computer Science, Institut National Polytechnique de Grenoble—INPG, HAL Id: tel-00454238, Available Online at: https://tel.archives-ouvertes.fr/tel-00454238, Feb. 8, 2010, pp. 1-118.

Chhaya et al., "Monocular Reconstruction of Vehicles: Combining SLAM with Shape Priors", International Institute of Information Technology, May 2016, 8 pages.

* cited by examiner

OBJECT DETECTION APPARATUS, SYSTEM AND METHOD USING FEATURE MAPS TRANSFORMED INTO A TEMPLATE COORDINATE SYSTEM

CROSS-REFERENCE TO RELATED APPLICATIONS

The present application is based on PCT filing PCT/EP2020/052174, filed Jan. 29, 2020, which claims priority to EP 19154616.7, filed Jan. 30, 2019, the entire contents of each are incorporated herein by reference.

BACKGROUND

Field of the Disclosure

The present disclosure relates to an object detection apparatus, system and method for determining the presence and the position and/or orientation of an object within a scene.

Description of Related Art

In the automotive context, detecting and precisely estimating the state, e.g. position, orientation, velocity, dimensions, of others objects from a predefined class, e.g. cars, observed by one or more sensors is important for understanding, predicting the environment and planning within. This is particularly difficult as sensor measurements are imprecise and objects have high variances in sensor appearance. One application is the representation of sensor measurements in a scenario where all relevant information in the surrounding environment observed by a sensor can be well represented by a two-dimension representation ("map"), which is usually the case for land and sea surface-based navigation, e.g. cars, robots, ships.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide an object detection apparatus, system and method enabling to determine the presence and the position and/or orientation and/or pose of an object within a scene with higher precision. It is a further object to provide a corresponding computer program and a non-transitory computer-readable recording medium for implementing said method.

According to an aspect there is provided an object detection apparatus comprising circuitry configured to
  obtain one or more feature maps of a measurement space generated from sensor data of a scene, the sensor data including position information and a feature map representing feature values of a feature at a plurality of positions in the measurement space,
  transform the one or more feature maps into a template coordinate system,
  compute a likelihood that the one or more feature maps correspond to an object template and a given candidate object configuration, and
  iteratively compute likelihoods for different candidate object configurations and determine the object configuration with the highest likelihood.

According to a further aspect there is provided object detection system
  a sensor configured to acquire sensor data of a scene, the sensor data including position information,
  circuitry configured to generate one or more feature maps of a measurement space from the acquired sensor data of the scene, and
  an object detection apparatus as disclosed herein for determining the object configuration.

According to a further aspect there is provided object detection method
  obtaining one or more feature maps of a measurement space generated from sensor data of a scene, the sensor data including position information and a feature map representing feature values of a feature at a plurality of positions in the measurement space,
  transforming the one or more feature maps into a template coordinate system,
  computing a likelihood that the one or more feature maps correspond to an object template and a given candidate object configuration, and
  iteratively computing likelihoods for different candidate object configurations and determining the object configuration with the highest likelihood.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed system, the disclosed method, the disclosed computer program and the disclosed computer-readable recording medium have similar and/or identical further embodiments as the claimed apparatus and as defined in the dependent claims and/or disclosed herein.

One of the aspects of the disclosure is to make use of sensor measurements (e.g. from a camera or a radar) to be represented in a map. It then finds parameter such as object center and orientation by registering a generic object template to the measurements. Preferably, a rough indicator of an object is used in addition. The object template may be trained in advance using examples for sensor measurements and true object positions and/or may be trained by use of actual measurements and while detecting the object.

Sensors such as camera or radar allow a joint measurement of position as well as features, i.e. additional information such as appearance or speed. Both are subject to sensor-specific measurement imprecisions which are (approximately) modelled and represented according to a further aspect in order to take them into account in subsequent steps of the object detection. The features may thus be encoded into a structure which efficiently encodes the position uncertainty.

Object detection shall herein be understood such that it includes estimating the object configuration (e.g. one or more of orientation, position, pose), e.g. of a car.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
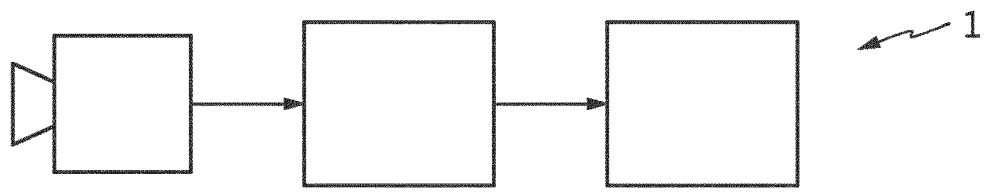
FIG. 1 shows a schematic diagram of an object detection system according to the present disclosure.

Referring now to the drawings, wherein like reference numerals designate identical or corresponding parts throughout the several views, FIG. 1 shows a schematic diagram of an object detection system 1 according to the present disclosure. The system comprises a sensor 2 configured to acquire sensor data of a scene, the sensor data including position information. For instance, the sensor 2 may continuously acquire images of the scene representing a time-sequence of images. The sensor 2 shall further be able to provide position information. For instance, a stereo camera setup may be used as sensor 2 that comprises two sensor units observing the same scene. In other embodiments, the sensor 2 may e.g. be a lidar or radar, optionally in combination with other suitable sensors. Generally, one sensor is used, but two or more of such sensors may be used as well.

The system 1 further comprises circuitry 3 configured to generate one or more feature maps of a measurement space from the acquired sensor data of the scene. Together with the possibility to obtain feature maps from several sensors or sensor units, the number of feature maps can be significantly larger than one.

The system 1 further comprises an object detection apparatus 4 for determining the object configuration, for instance for detecting the presence and the position and/or orientation of an object within the scene from the one or more feature maps. The circuitry 3 and the object detection apparatus 4 (and its circuitry) may be implemented by separate processors or computers or by a common processor or computer. Hence, dedicated hardware or programmed hardware using dedicated software may be used for implementing said components of the system.

Figure 2:
FIG. 2 shows an exemplary scene in which one or more objects may be detected and their configuration determined by a device, system and method according to the present disclosure.

In a realistic scenario the system 1 may be used in a vehicle, such as a car, bus or truck, on or in which one or more sensors 2 are mounted to acquired sensor data, such as continuous (stereo) video data and/or radar data, of the scene in front of the vehicle to detect (and distinguish) moving and non-moving objects, such as other moving vehicles, standing vehicles, bicyclists, pedestrians, houses, etc. An exemplary scene in such an application scenario is shown in FIG. 2. in order to predict future situations, avoid collisions by instructing/warning the driver of the vehicle or autonomously actuating the braking system and/or changing the movement direction of the vehicle.

Figure 3:
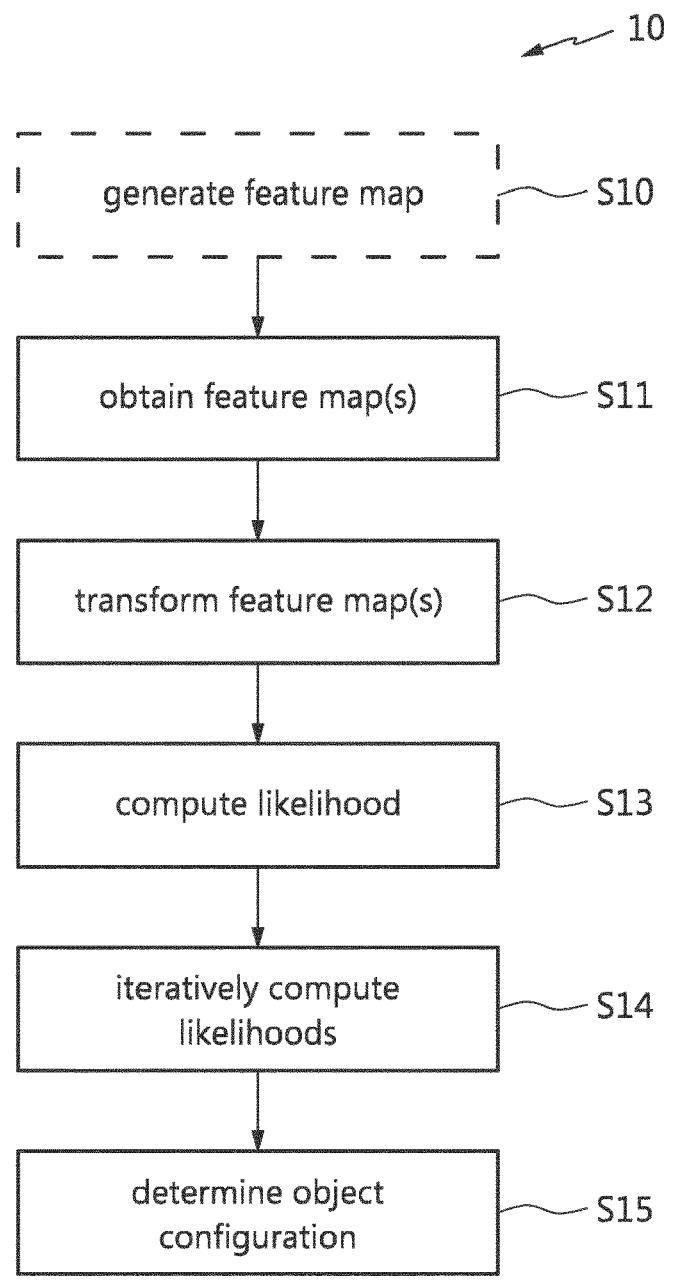
FIG. 3 shows a flowchart of an object detection method according to the present disclosure.

FIG. 3 shows a flow chart of an object detection method 10 according the present disclosure, illustrating the steps that are carried out by the circuitry of the object detection apparatus 4 of the system 1 shown in FIG. 1.

In a first step S11 one or more feature maps of a measurement space generated (by the circuitry 3) from the sensor data (e.g. a single image) of a scene are obtained. A feature map represents feature values of a feature at a plurality of positions in the measurement space. In the above described scenario of an application of the system in a vehicle, the feature map may e.g. represent feature values of occupancy, existence of obstacle, classification, appearance, velocity, height measurement, color, texture, shape, surface orientation or material properties as a feature.

In a second step S12 the one or more feature maps are transformed into a template coordinate system. This may e.g. be done by transforming the one or more feature maps into a general coordinate system common to the one or more feature maps to obtain one or more intermediate feature maps and then transforming the one or more intermediate feature maps into the template coordinate system to obtain the one or more transformed feature maps. Hereby, the transform may depend on an assumed configuration of the object configuration, e.g. pose and position.

In a third step S13 a likelihood that the one or more feature maps correspond to an object template and a given candidate object configuration is computed. For instance, the one or more feature maps are transferred to the template coordinate system assuming a candidate object configuration. Then, the previously trained probability distribution is evaluated for each measurement in each feature map to jointly determine the likelihood.

In an embodiment this step may use a signed distance function mapping template coordinates to a scalar signed distance describing the shortest distance of a point to a bounding box of a fixed size. Hereby, the signed distance function may be used to approximate the two-dimensional template coordinates by a single representative coordinate in order to reduce the complexity of a probability distribution. The motivation for this choice is the assumption that distinguishing between inside and outside of a vehicle is more important than distinguishing left and right of the vehicle.

The probabilistic distribution may be represented by a two-dimensional array of bins. The probabilistic distribution may be created in a training step from a suitable large number of examples, each comprising observed feature maps containing an object as well as the true object state parameters. The training process divides the space of all combinations of template coordinates and feature values into a finite number of small regions. The frequency of occurrence of each coordinate-feature-combinations in the examples is counted and stored in a bin associated with each region. The bins are normalized to obtain a probability distribution conditioned for each feature conditioned on the template coordinate. Further, the probabilistic distribution may be determined by use of a discretization function mapping a feature value of the transformed feature map to a bin of the probabilistic distribution.

In step S13 a likelihood is computed that the one or more feature maps correspond to an object template and a given candidate object configuration. For instance, in an embodiment an object candidate is compared within the transformed feature map to an object template is iteratively repeated using differently orientated and/or translated versions of the object template to find the approximately best configuration, assessed by the likelihood of observation given the considered configuration. This likelihood function is composed of previously determined probabilistic distributions.

In step S14 likelihoods for different candidate object configurations are iteratively computed and in step S15 the object configuration with the highest likelihood is determined. The iteration is stopped when the numerical solver used to determine the approximately best solution determines that a sufficiently good solution has been found. This decision can be based on the relative change over iterations, the properties of the local model (gradient) indicating that local optima has been reached, and/or a limit on the number of iterations. If the stopping criterion is not met in S14, the method continues in step S12 with updated orientation/translation parameters. Indeed, steps S12-S14 implement the numerical likelihood maximization problem. On completion, the approximately best parameter is returned which represents the position and orientation of the object.

The number of iterations is not pre-defined but continuation of the computation is preferably decided in each iteration. The iteration is stopped when the numerical solver used to determine the approximately best solution determines that a sufficiently good solution has been found. This decision can be based on the relative change over iterations, the properties of the local model (gradient) indicating that local optima has been reached, and/or a limit on the number of iterations.

Each time the method considers one pose parameter p (position, orientation), it computes the likeliness that the parameter simultaneously explains the data of all feature maps M. To this end, the likeliness function $P(M\_1, M\_2, \ldots, M\_mlp)$ is evaluated. The result is a scalar value and its computation involves all feature maps, all trained probability functions $P\_1, \ldots, P\_m$ and parameter p, and thus jointly works on all feature maps.

Each iteration consists of finding an updated parameter p (usually near the p determined in the previous iteration) which increase the value of $P(M\_1, \ldots M\_mlp)$ as compared to the previous iteration. The exact implementation of finding the updated p is depending on the numerical method behind it. In the simplest case it amounts to determining the gradient of $P(M\_1, \ldots M\_mlp)$ with respect to p, and adding a scaled version of the gradient to the previous p.

In an embodiment, in the fifth step S15 the presence and the position and/or orientation of the object within the scene is determined from the different probabilistic distributions. This may be done by solving an optimization or maximization problem maximizing the likelihood that an object candidate within the transformed feature map corresponds to an object template.

In an embodiment, initially the feature maps of the measurement space are generated from the acquired sensor data of the scene by the method 10 as (optional) initial step S10. In other embodiment, the feature map is generated separately and the feature map is delivered as input to the method 10.

In another embodiment two or more feature maps are initially obtained in the first step S11, and the steps of transforming (S12) and computing (S13) are performed jointly on the feature maps by evaluating the joint likelihood function. This solves the problem of fusing the result of considering each feature map independently. Then, the step S14 of iteratively repeating is performed jointly on said two or more feature maps and the presence and the position and/or orientation of the object within the scene are determined in step S15 from the different probabilistic distributions determined from the two or more feature maps. Hence, the object configuration (position, orientation) is a result of the iterative process, more precisely the best configuration found, as assessed by the likelihood function. The presence can be determined based on the value of the likelihood function for the best configuration.

The present disclosure thus addresses and solves a number of shortcoming of existing methods:
i) Many state estimation methods require the selection of measurements which belong to the object of interest (inliers), but not to other objects or environment (outliers). This is an additional error source and in cases of failure reduces precision or accuracy.
ii) State estimation methods are often designed for a single sensor type and thus do not allow to jointly make use of all available information, thus reducing precision.
iii) Inhomogeneous measurement representation (value encoding, coordinate system, discretization, resolution, . . . ) due to different sensor properties might need to be converted to a common representation before jointly using them. This conversion might introduce additional errors.
iv) State estimation working on one data representation only require to fuse all available data first, requiring the design and implementation of a fusion method.
v) Imperfections in the measurements such as sensor noise, discretization errors, outliers etc. are inevitable and will increase state estimation errors. The choice of an appropriate preprocessing and/or incorporating an appropriate error model is cumbersome and sometimes neglected or simplified.
vi) In-class variance—the differences between all possible objects belonging to the same category of interest—in the appearance to sensors must be handled. This is a complex task and often reduced to a very simple description, e.g. bounding boxes. Simple descriptions, however, fail to represent typical properties of the object class which might act as additional hint in state estimation, thus reducing its precision.

In the following, an embodiment of the disclosed method will be explained in more detail. The method assumes that one or more sensors provide measurements arranged as m feature maps $M_1, \ldots, M_m$. Each sensor may provide one or more feature maps.

Each feature map $M_i$ assigns to each coordinate v in the feature map domain $V_i$—a finite set of measurement position coordinates—a feature vector f from a set of possible feature values $F_i$. Features might be scalar or vector-valued information on occupancy, existence of obstacle, classification, appearance, velocity, height measurements etc., associated with position v and possibly complemented by a precision or uncertainty estimate.

Furthermore, each feature map $M_i$ is assumed to provide a coordinate mapping $h_i$ from the feature map domain $V_i$ to a common two dimensional domain W suitable for describing the environment (world) of interest well. This could e.g. be a two-dimensional map in Cartesian coordinates centered in the platform position.

Further, a mapping $t(w, p)$ is made from coordinates w in W to a template domain T, parametrized by object state parameters p, which may include object position, orientation, size, shape etc. Coordinates in template domain are thus compensated for the parameters to be determined in order to compare to the template. This particularly eliminates the need to encode possible geometric variation in appearance in the template.

For example if position and orientation may be estimated, template coordinates describe measurement positions relative to the center of a bounding box always oriented in the same direction. Incorporating object orientation in the parameter thus allows to use one template for all possible orientations and positions.

In another embodiment, 2D object center $c=(c_x, c_z)$, orientation $\theta$ and bounding box width $a_z>0$ and length $a_x>0$ may be determined. The object state describes the object pose as $p=(\theta, c_x, c_z, a_x, a_z)$. Then, for world coordinate $w \in W$ and parameter vector p a suitable transformation is given by:

$$t(w, p) := \frac{1}{2}\begin{pmatrix} a_x^{-1} & 0 \\ 0 & a_z^{-1} \end{pmatrix} R(\theta)^T (w - c) \text{ with rotation matrix } R(\theta) := \begin{pmatrix} \cos(\theta) & \sin(\theta) \\ -\sin(\theta) & \cos(\theta) \end{pmatrix}.$$

This transforms coordinates lying in a bounding box whose pose and shape is described by p to $t(w, p) \in [-1, +1] \times [-1, +1]$. This transformation allows to use one template for all object sizes, orientations and positions. Remaining detailed differences in shape may be handled by the template.

For each feature map a discrete probabilistic distribution $P_i(f|t)$ may be created, each represented by a two-dimensional array of $n_{i,f} \times n_{i,t}$ of bins $B_i(k, l)$, i.e. non-negative values. An individual bin of $B_i$ is addressed by a pair of indices (k, l), where k and l are indexes, e.g. $k \in \{1, \ldots, n_{i,f}\}$ and $l \in \{1, \ldots, n_{i,t}\}$. Also a mapping $b_i(f, t)$ is made to define the particular transfer of a feature value $f \in F_i$ and template coordinates $t \in T$ into an index pair (k, l) addressing one of the $n_{i,f} \times n_{i,t}$ bins. The mapping can be created by defining a value range for f and t which covers all of the expected values of f and t, respectively. Then the ranges of f and t are divided into $n_{i,f}$ and $n_{i,t}$ disjoint subsets (intervals, regions) of varying or same size and shape, respectively, and each subset is assigned a unique index $k \in \{1, \ldots, n_{i,f}\}$ and $l \in \{1, \ldots, n_{i,t}\}$. Especially for the two-dimensional domain of t it is sufficient to choose an enumeration of the subsets, but no specific order is required. Then $b_i(f, t)$ returns the unique index k and l in which f and t lie, respectively. In this design, k only depends on f and l only depends on t. As an extension of this design, the bin indices k and l may be chosen to be dependent from both f and t each.

The example below demonstrates the design of $b_i(f, t)$ for a selected case.

With these prerequisites, an embodiment of the method decomposes into two steps:
i) Training (or learning), including the step of creating probabilistic distributions $P_1, \ldots, P_m$ (represented by $B_i(k, l)$) from n examples. Each example $j=1, \ldots, n$ consists of feature maps $M_1^j, \ldots, M_m^j$ and correct object state parameters $p^j$ and is assumed to be provided by an external method.
ii) Matching, i.e. application of the probabilistic distributions $P_1, \ldots, P_m$ (i.e. $B_i(k, l)$) for determining object state parameters p given measurements encoded as feature maps $M_1, \ldots, M_m$.

These two steps will be explained in more detail in the following.

The training (step i)) may work as follows:
initialize all bins with zero: $B_i(k, l) \leftarrow 0$ for $i=1, \ldots, m$, $k=1, \ldots, n_{i,f}$, $l=1, \ldots n_{i,t}$
for each feature map index $i=1, \ldots, m$
  for each example index $j=1, \ldots, n$
    read or create example feature map $M_i^j$
    read or create example object pose $p^j$
    for each coordinate $v \in V_i$
      read $f_i^j(v)$, i.e. the feature value located at coordinate v in feature map $M_i^j$
      compute bin index pair $(k, l) \leftarrow b_i(f_i^j(v), t(h_i(v), p^j))$
      increment bin $B_i(k, l)$ by one
  for each $l=1, \ldots, n_{i,t}$
    $s \leftarrow \sum_{k=1}^{n_{i,f}} B_i(k, l)$
    for each $k=1, \ldots, n_{i,f}$
      $B_i(k, l) \leftarrow B_i(k, l)/s$ Here, $b_i(f_i^j(v), t(h_i(v), p^j))$ may be computed by step-by-step evaluation: The feature value $f_i^j(v)$ directly defines the first argument to $b_i$. Furthermore, v is transferred from feature map domain to world coordinate domain using $h_i(v)$. The result is then transferred to template domain using $t(w, p)$ which also depends on p, and provides the second argument to $b_i$. In a last step, the bin index pair is computed using $b_i$ based on its two arguments.

In the matching (step ii)), for a given set of measurements encoded as feature maps $M_1, \ldots, M_m$ the precise state p of an object assumed to be located in the observed region shall be determined. It is assumed that there is an external method providing the information that there is an object as well as a rough prediction of the true state $p_0$.

Determining the refined state then comprises numerically solving the optimization problem $$p^* \in \arg\max_{p \in P} P(M_1, \ldots, M_m | p)$$

with $$P(M_1, \ldots, M_m | p) := \Pi_{i=1}^m \Pi_{v=1}^{v_i} B_i(b_i(f_i^j(v), t(h_i(v), p))),$$

known as likelihood maximization. Alternatively, the optimization problem $$p^* \in \arg\max_{p \in P} L(M_1, \ldots, M_m | p)$$

$$L(M_1, \ldots, M_m | p) := \Sigma_{i=1}^m \Sigma_{v=1}^{v_i} L_i(b_i(f_i^j(v), t(h_i(v), p))),$$

with $$L_i(k,l) := \log B_i(k,l)$$

can be solved.

Numerical optimization can be performed using existing techniques for non-linear nonconvex unconstrained optimization, including gradient descent, Levenberg-Marquardt, Newton's method and quasi-Newton's method. Initialized by $p_0$, they provide an approximate $p^*$ which is locally optimal. The resulting parameter $p^*$ directly provide object state parameters which describe the measurements given by $M_1, \ldots, M_m$ best in the environment of the initialization $p_0$. Additionally, a subsequent verification may follow to reject incorrect or imprecise poses. The value of the optimization criterion at $p^*$ might be interpreted for that, e.g. by comparing to a threshold.

In an embodiment of the present disclosure two feature maps may be used that describe the measurements derived from a stereo camera, both given in coordinates $v=(X, Z) \in V_i$ (i.e. in a respective feature map domain). Feature map $M_1$, referred to as "height", describes the average height above road level of all point at $v=(X, Z)$. Feature map $M_2$, referred to as "isCar", describes the belief that an object with the appearance of a car (i.e. colors, textures, shape as seen by one camera) is located at point $v=(X, Z)$.

For mapping from sensor coordinates to world coordinates the identity function may be used, i.e. $h_1(v)=v$ and $h_2(v)=v$, as the data in this example is already given in a Cartesian metric coordinate system and as it is assumed that the sensor is located at $w=(0,0)$. The object state describes the object pose as $p=(\theta, c_x, c_z)$ with object orientation $\theta$ and 2D object center $c=(c_x, c_z)$ in the world coordinate system.

Then, for world coordinate $w \in W$ (i.e. in a world coordinate system) and parameter vector p it is defined $$t(w,p) := R(\theta)^T (w-c),$$

with rotation matrix $R(\theta) := \begin{pmatrix} \cos(\theta) & \sin(\theta) \\ -\sin(\theta) & \cos(\theta) \end{pmatrix}$.

Figure 4:
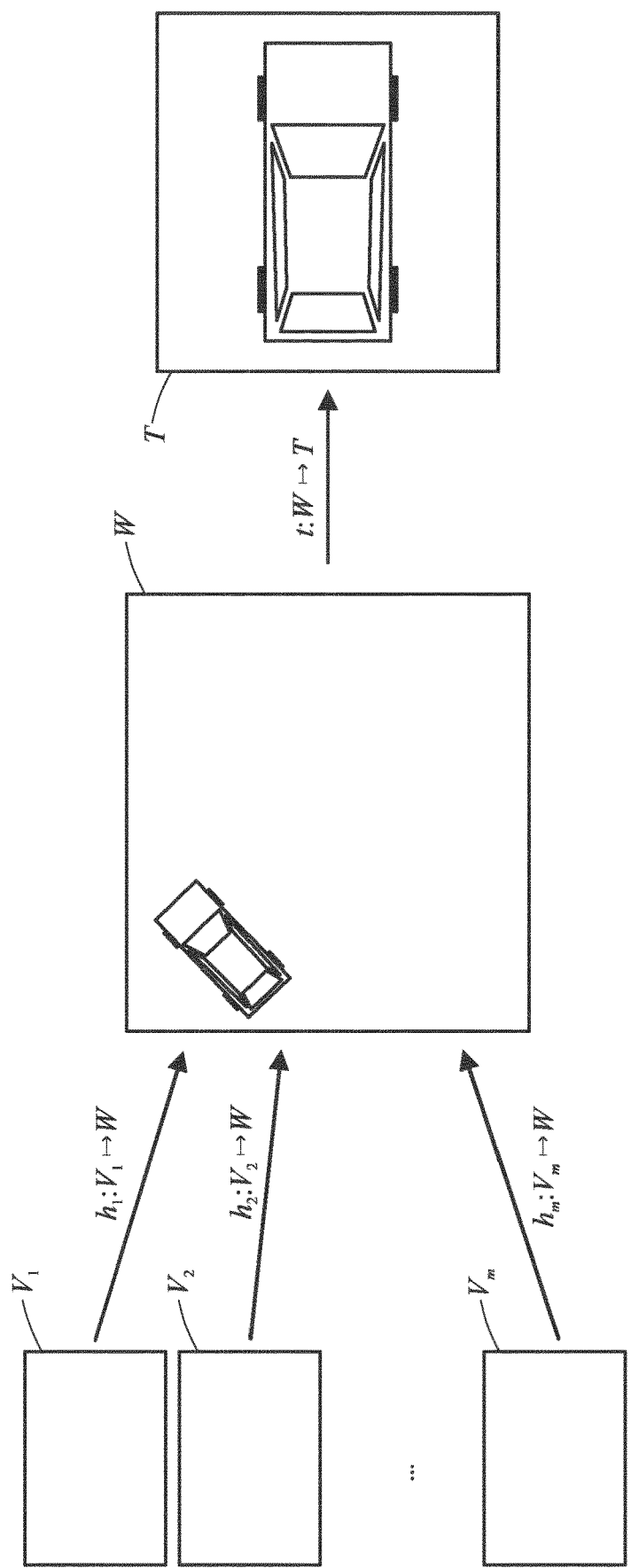
FIG. 4 shows a schematic diagram illustrating the relation between feature maps, mapping functions, world coordinates and template coordinates.

Transfer from template coordinates $t=(t_1, t_2)=t(w)$ (in a template domain T) and some feature value $f_1$ or $f_2$ to bin coordinates is implemented by $b_1$ and $b_2$. The relation between several feature maps, the mapping functions, world coordinates and template coordinates is schematically illustrated in FIG. 4.

Further, a discretization function $d(x, a, b, m)$ mapping a value x in range $[a, b]$ to one of m bins may be used, with the first being addressed by 1. If x is outside $[a, b]$ it is mapped to the nearest bin:

$$d(x, a, b, m) := \max\left(1, \min\left(m, \text{round}\left(\frac{x-a}{b-a} * (m-1) + 1\right)\right)\right)$$

A signed distance function $s(t)$ mapping 2D template coordinates t to a scalar signed distance may be used describing the shortest distance of a point to a rectangular bounding box of fixed size—here 4.59 m×1.69 m—around the car. The sign indicates whether t is inside ($s<0$) or outside ($s>0$) the bounding box.

Using s and d it can be defined:

$$b_1(f,t) = (d(f,-1,+5,61), d(s(t),-1,+3,41))$$

$$b_2(f,t) = (d(f,0,1,41), d(s(t),-1,+3,41)).$$

For instance, the height within range $[-1, +5]$ is discretized into $n_{1,f}=61$ bins, and the signed distance $s(t)$ in $[-1, +3]$ is discretized into $n_{1,t}=n_{2,t}=41$ bins.

Then, for input measurements in the form of $M_1$ and $M_2$, the joint probability is maximized using an iterative method, starting from a rough initialization $p_0$ provided by an external method. The result represents the estimated pose of the car.

Figure 5:
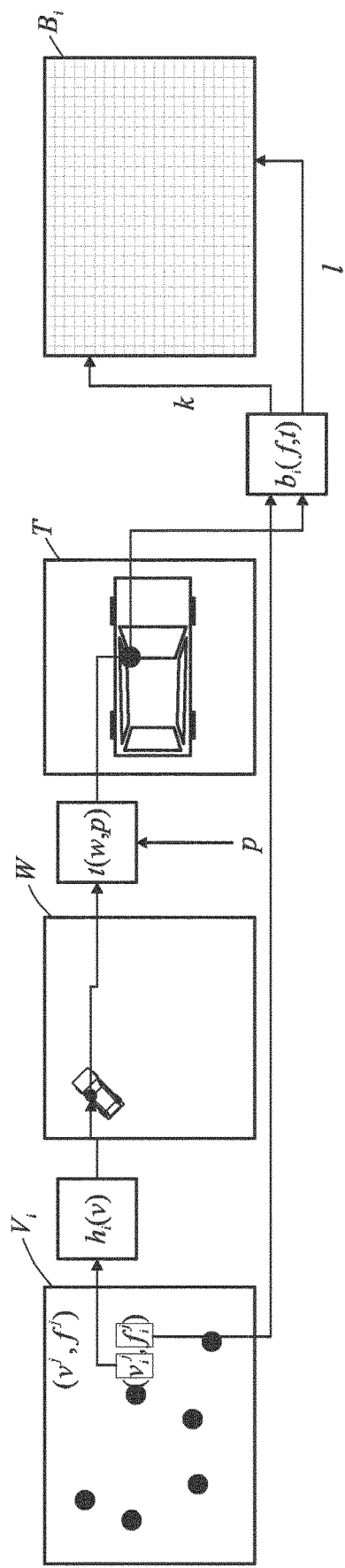
FIG. 5 shows a schematic diagram illustrating steps of an embodiment of a method according to the present disclosure.

FIG. 5 shows a schematic diagram illustrating the above described transfer from a measurement at position $v_i^j$ and feature vector $f_i^j$ to world domain W, to template domain T and to the bin description B used to represent the conditional probabilities.

In the following, some of the above described steps will be illustrated by exemplary diagrams that may be used in the above described scenario of detecting objects in a scene like the one shown in FIG. 2.

Figure 6:
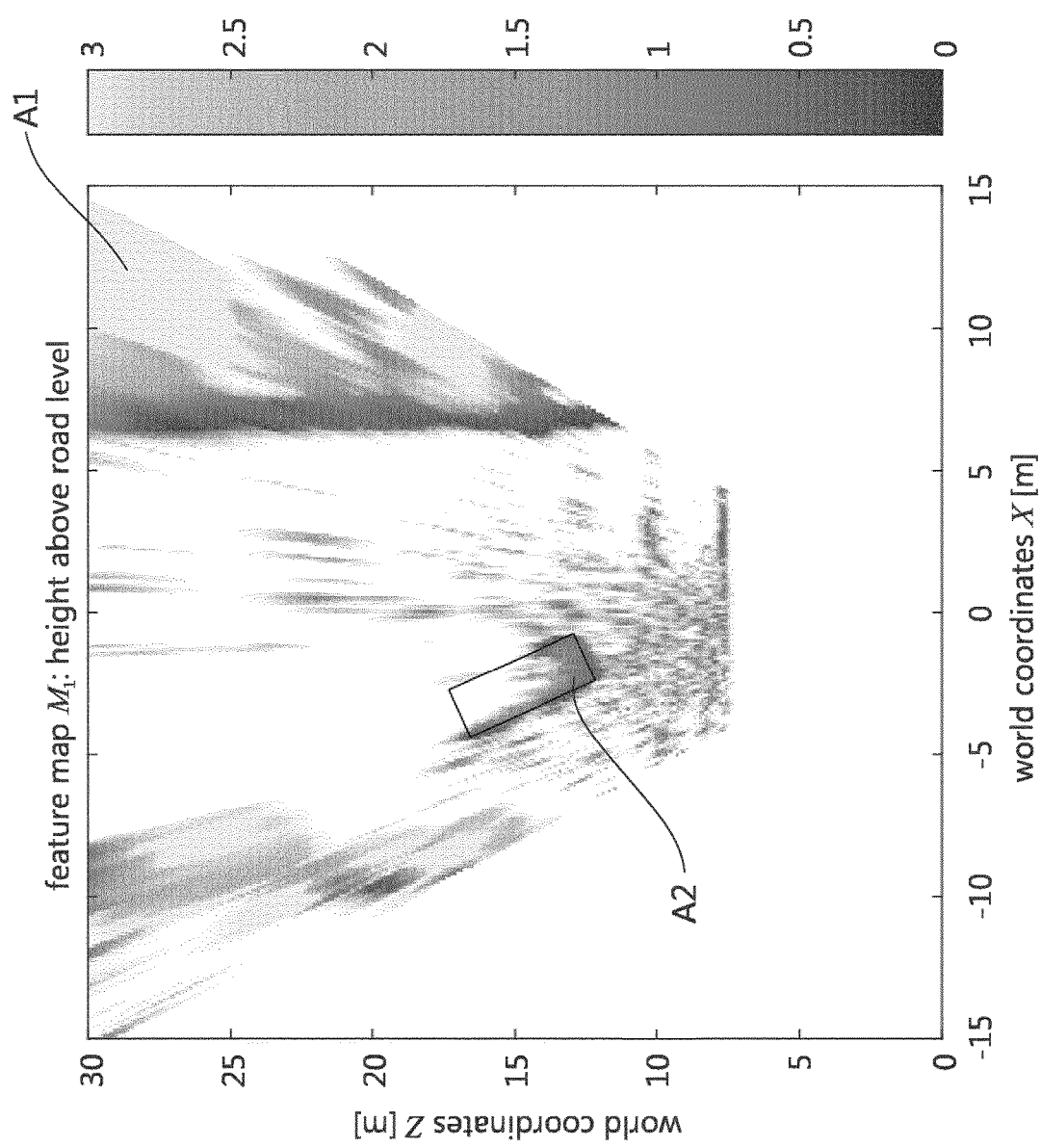
FIG. 6 shows a feature map indicating the height above road level.

FIG. 6 shows a feature map $M_1$ (e.g. generated from left and right images of a stereo camera) indicating the height above road level for points $v=(X, Z) \in V_1$. White indicates unobserved regions. The map was cropped to $[-15, +15] \times [0, 30]$ for better visualization. The feature map $M_1$ hence represents a bird's eye view of the scene shown in FIG. 2. It may be derived from this feature map that the area A1 may represent a building and that the area A2 may represent a car.

Figure 7:
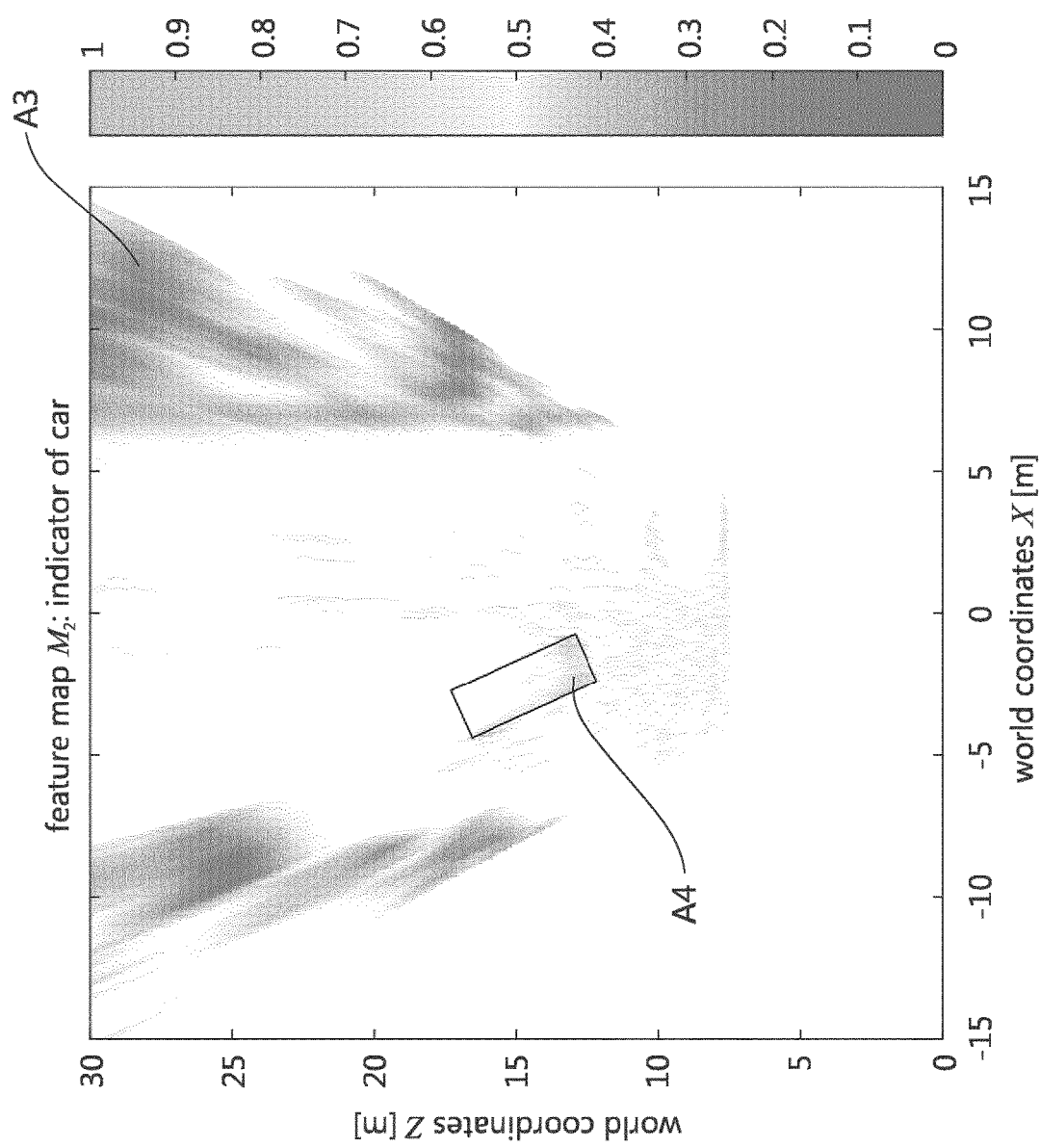
FIG. 7 shows a diagram illustrating a feature map indicating whether a point has the appearance of a car.

FIG. 7 shows a feature map $M_2$ indicating whether a point $(X, Z) \in V_2$ has the visual appearance of a car. White indicates unobserved regions. The map was cropped to $[-15, +15] \times [0, 30]$ for better visualization. The feature map $M_2$ hence represents another bird's eye view of the scene shown in FIG. 2. It may be derived from this feature map that the area A3 does not represent a car and that the area A4 may represent a car.

Figure 8:
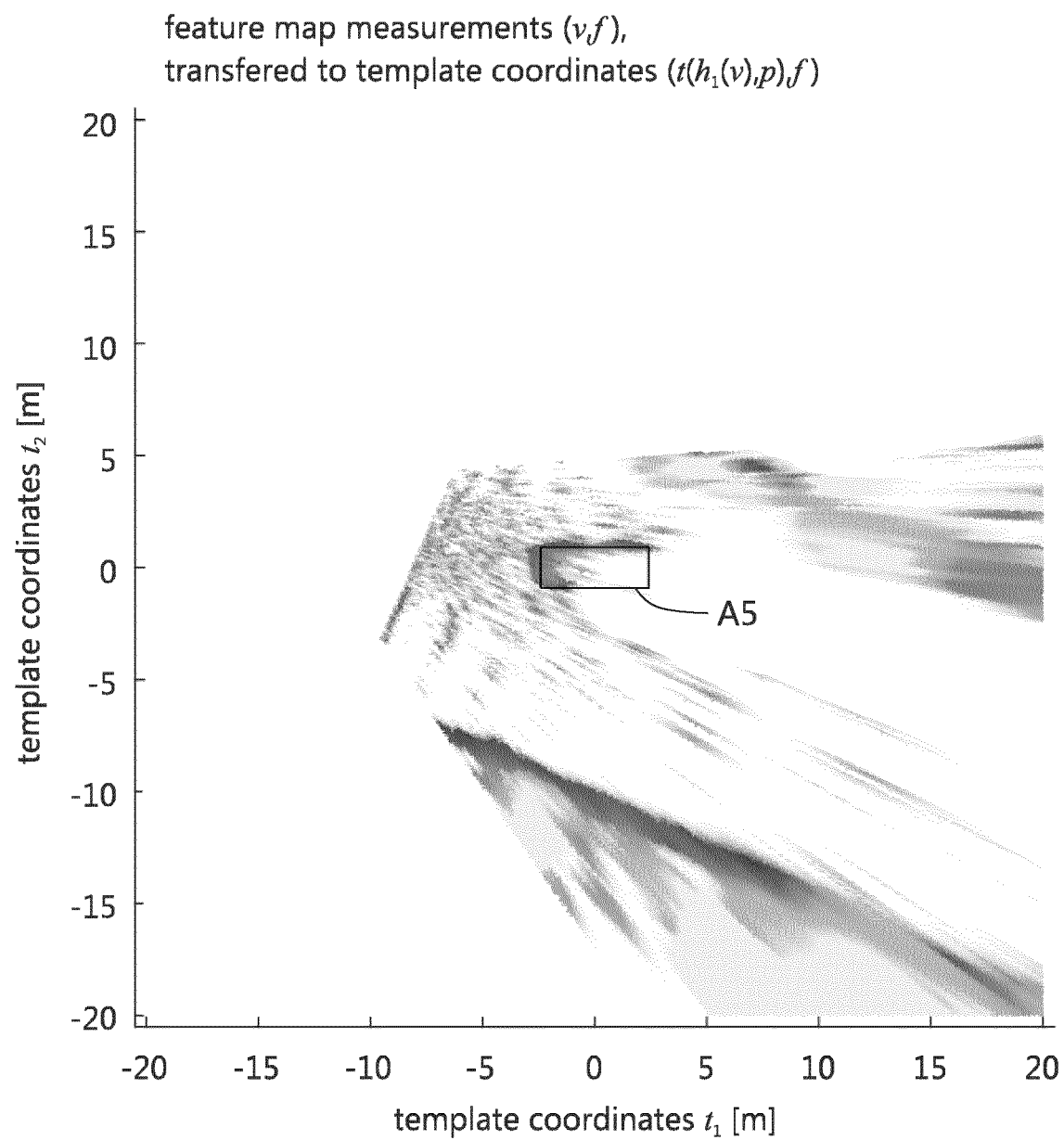
FIG. 8 shows a diagram illustrating feature map measurements transferred to template coordinates.

FIG. 8 shows feature map $M_1$ measurements (v, f) transferred to template coordinates $t(h_1(v), p)$ with p describing a car pose. A bounding box A5 with fixed (4.59 m×1.69 m) is overlaid for reference.

Figure 9:
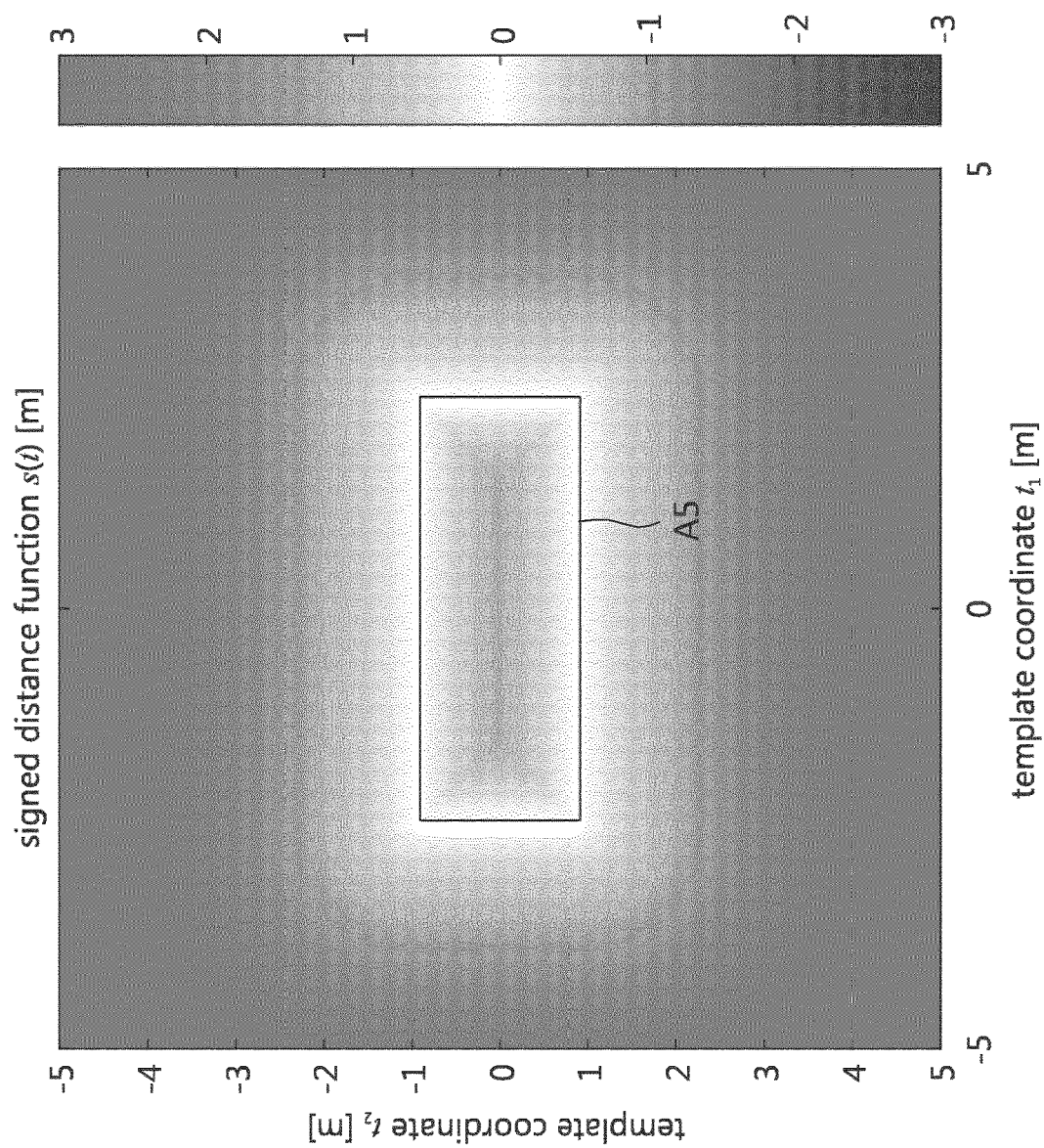
FIG. 9 shows a diagram illustrating a signed distance function.

FIG. 9 shows a signed distance function $s(t)=s(t_1, t_2)$ with its color-encoded value, indicating the nearest distance of a point $(t_1, t_2)$ to the perimeter of the bounding box A5 of fixed size (4.59 m×1.69 m). The signed distance function is independent of the measurements in the feature maps and describes a rule for transferring position measurements (e.g. in a transferred feature map) from the template coordinate system to an auxiliary coordinate system—the signed distance.

Figure 10:
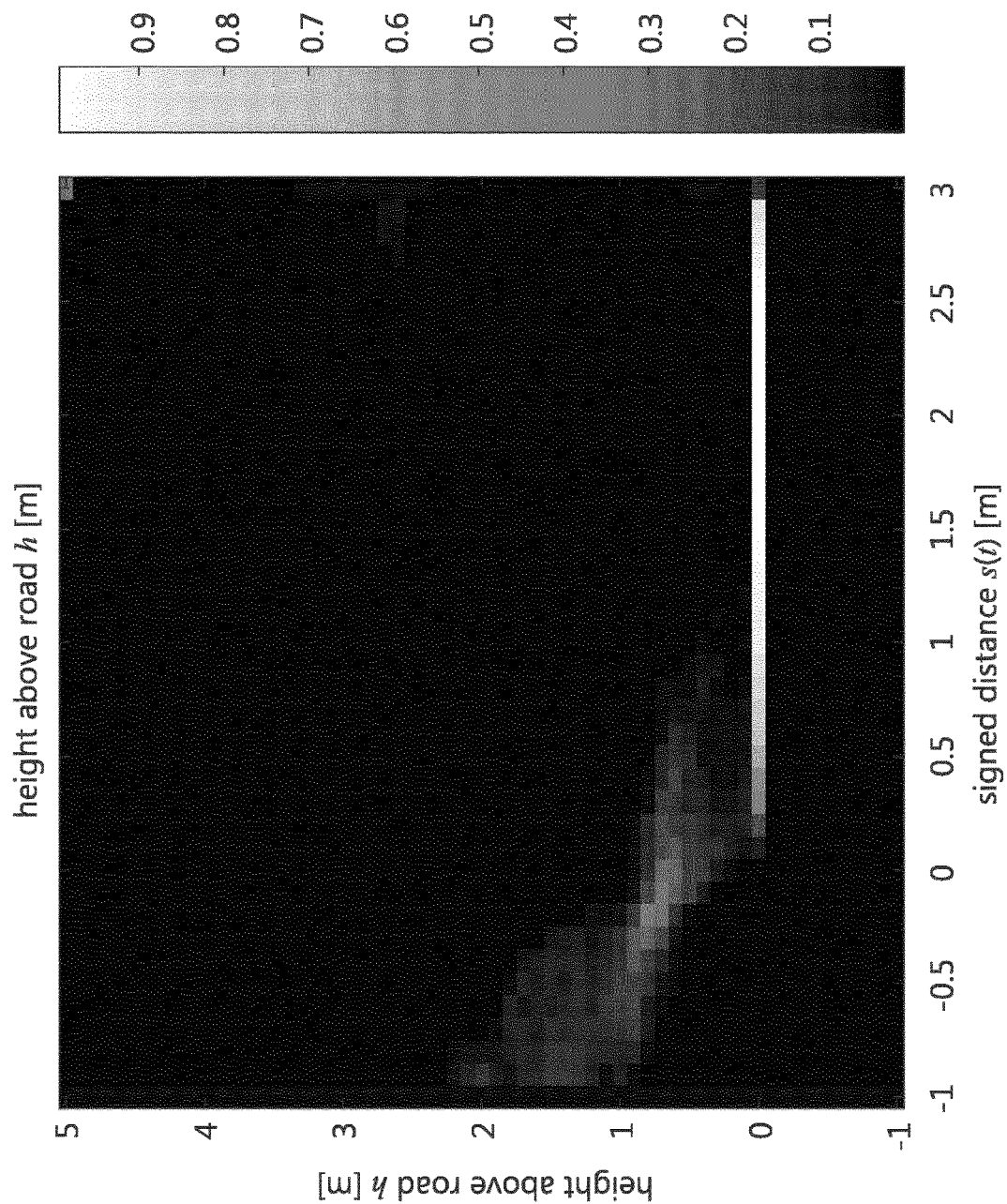
FIG. 10 shows a conditional probability function for the height above road given the signed distance.

FIG. 10 shows a conditional probability function P(height|s) for the height above road (see FIG. 6), given the signed distance to bounding box.

Figure 11:
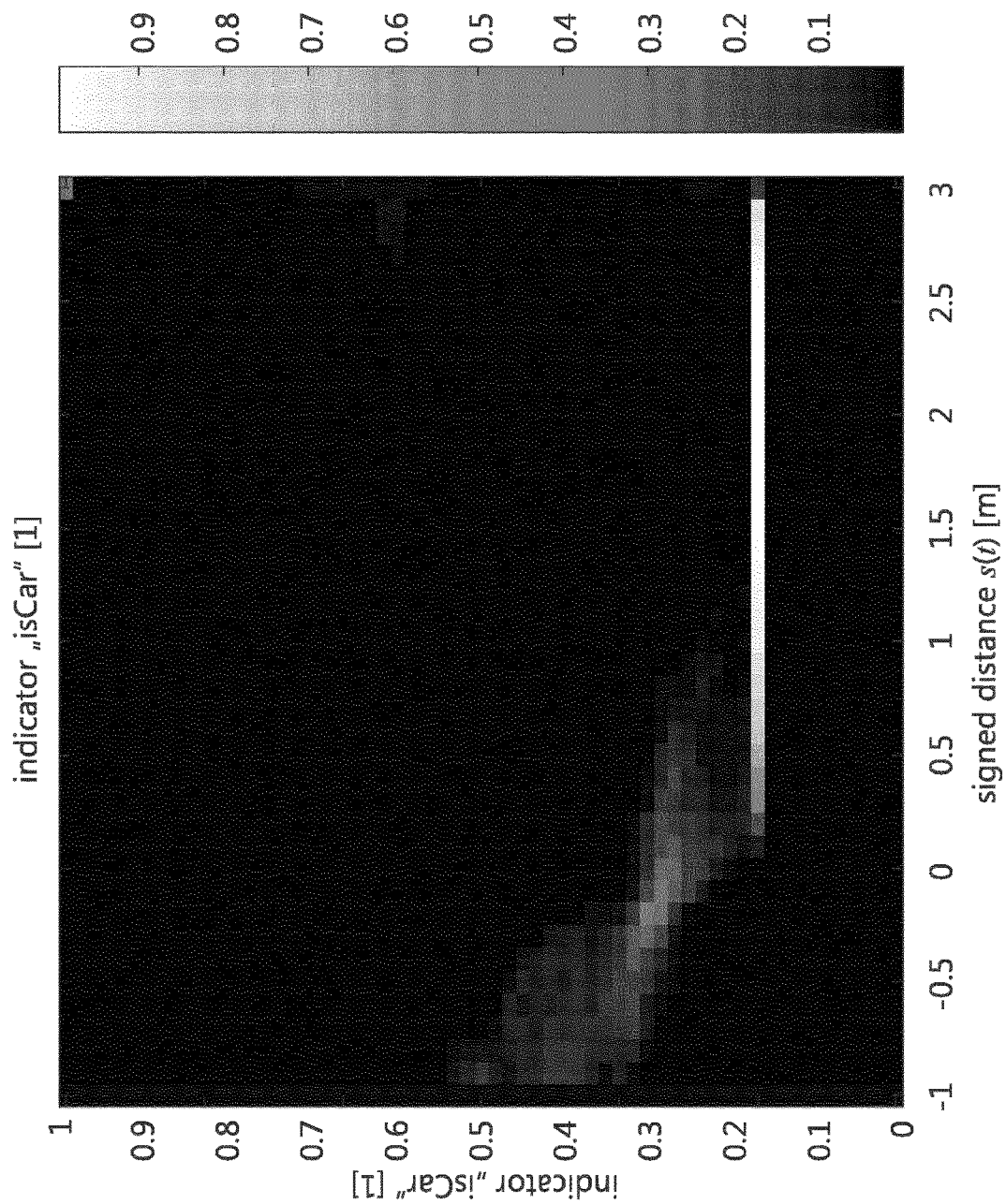
FIG. 11 shows a diagram illustrating a conditional probability function for the indicator that a point having the visual appearance of a car given its signed distance.

FIG. 11 shows a conditional probability function P(isCar|s) for the indicator that a point has the visual appearance of a car (see FIG. 7), given the signed distance to bounding box.

Figure 12:
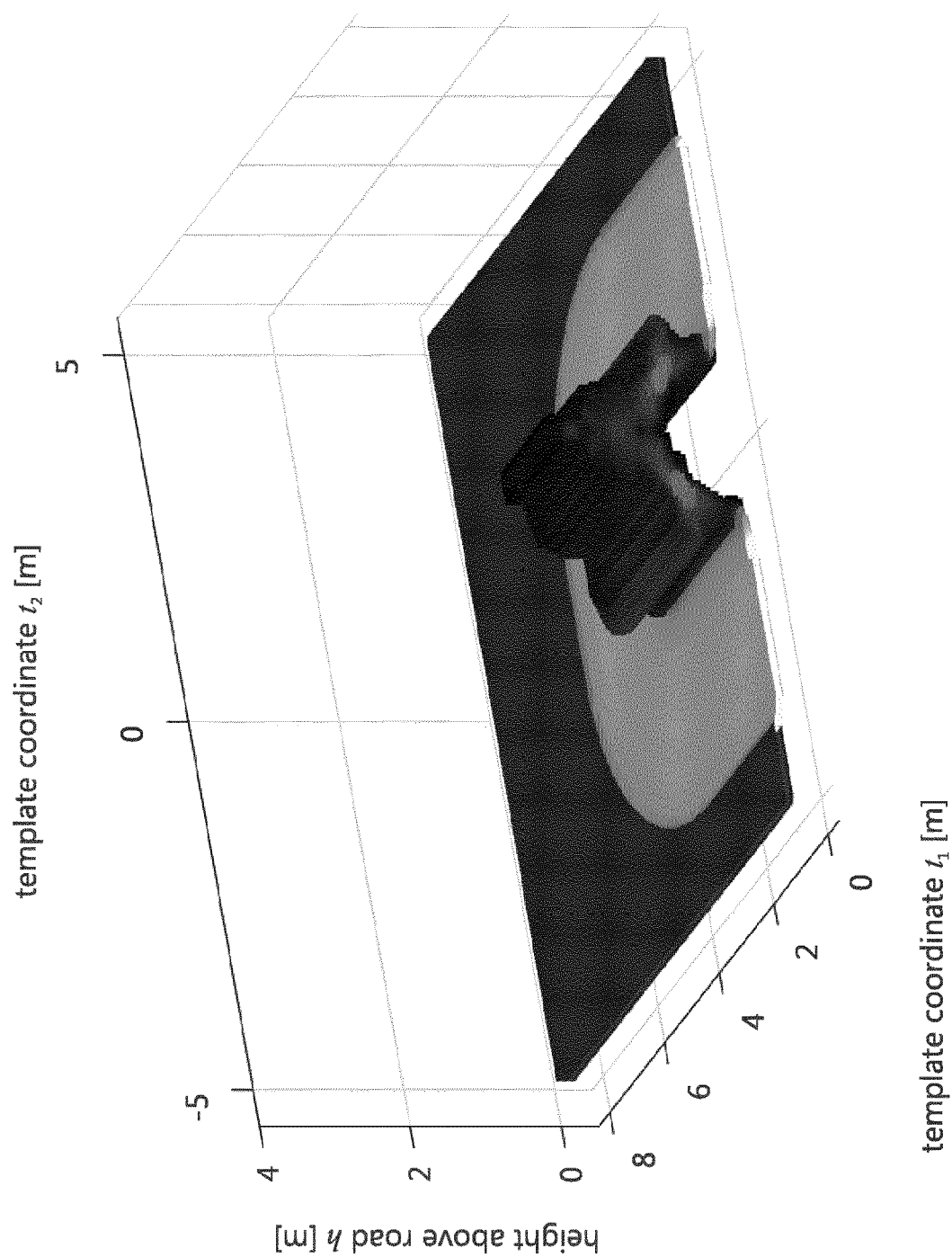
FIG. 12 shows a diagram illustrating a conditional probability function for the height above road given the template coordinates, visualized as an (approximate) density plot.

FIG. 12 shows a conditional probability function P(height|s(t)) for the height above road, visualized as an (approximate) density plot.

Figure 13:
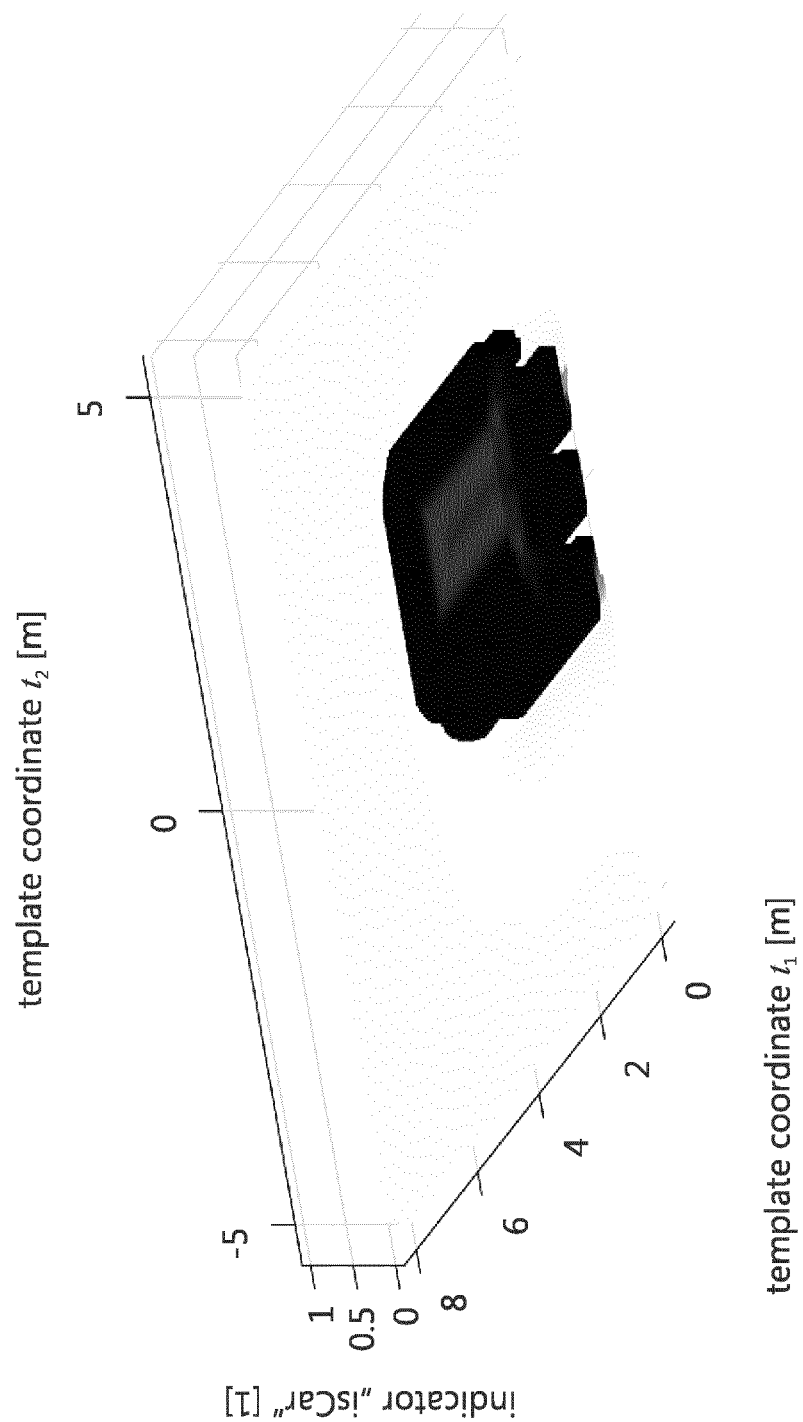
FIG. 13 shows a diagram illustrating a conditional probability function for the indicator that a point is a car given its template coordinates, visualized as an (approximate) density plot.

FIG. 13 shows a conditional probability function P(isCar|s(t)) for the indicator that a point has the visual appearance of a car, visualized as an (approximate) density plot.

Figure 14:
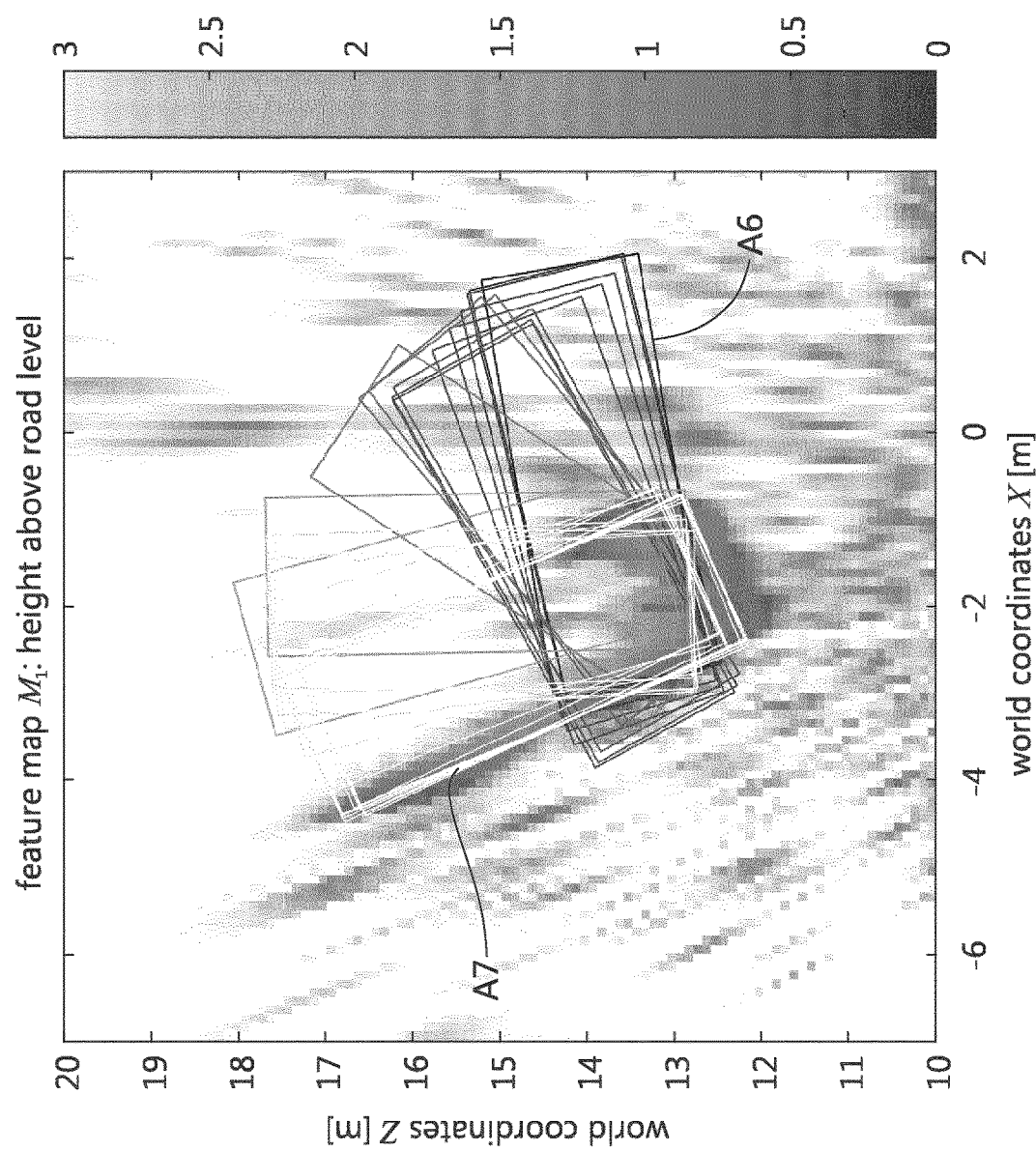
FIG. 14 shows a diagram illustrating a detail of feature map and the evolution of the object state (rectangles) over multiple iterations.

FIG. 14 shows a detail of feature map $M_1$ and the evolution of the object state (rectangles) over 28 iterations. The color of the rectangle indicates the increase of the joint probability from initialization (dark color; rectangle A6) to final result (bright color; rectangle A7).

The above described approach aims at using as much information from the measurements as possible, preferably all information, with the aim to increase precision of the state estimate. Preferably, it makes use of all provided measurements and no data is neglected. Thus, an approach for previously removing irrelevant measurements is not required. Consequently, state estimation precision is not influenced negatively by accidentally removed relevant measurements.

Further, data from several sensors or the same sensor but different pre-processing steps can be incorporated in the state estimation. Consequently, the state estimation precision is not impaired by not using available measurements. Inhomogeneous data representations are possible. In particular it is possible to choose representations and coordinate systems which are best suited for each measurement source or sensor and no conversion is necessary. Deterioration of state estimation precision due to information loss during conversion is avoided.

Different sensor and/or pre-processing steps can be jointly used and it is not necessary to design and implement a fusion step to transfer them to common representation. Furthermore, state estimation precision is not affected negatively by a possible information loss during fusion. Imperfections in the feature maps such as sensor measurement noise, discretization errors, outliers etc. may also be respected in the matching step. This may be implemented by using measurements with similar behavior in the training steps and thus no further error model is necessary. Additional pre-processing of the data can be avoided or reduced.

In-class variance of object appearance in the sensors can be modelled twofold: Using a representative data set in the training phase will encode the variances in the probability distribution. Furthermore, it is possible to extend the parameter vector by shape parameters, e.g. width and length of the object. This reduces the necessity to design and select from a set of models to represent the in-class variance.

In other embodiments the sensor 2 (e.g. a stereo camera, radar, LIDAR, . . . ) of the system 1 is assumed to provide a possibly high number of point measurements (u, f), each consisting of a position measurement u in the sensor domain U as well as complementary measurements f, such as existence of an obstacle and/or its properties (surface orientation, height, velocity, color, classification, reflectivity, . . . ). Both position and complementary measurements are assumed to be affected by measurement uncertainties which vary over the position domain U. It is assumed that a model is known which (approximately) describes the position-dependent measurement uncertainty of u.

The aim of such embodiments is to transform the sensor measurements (u, f) into a data structure which is compact, capable of representing position uncertainties, does not neglect measurements, and provides a sufficiently detailed representation of the observed environment. Hence, one or more of the following shortcomings of common measurement representations are addressed and shall be fixed:

i) Common data representations handle measurement position uncertainties, e.g. caused by resolution limitations, in a sub-optimal way: Either they do not encode the uncertainty of s at all such that this information is not available to following processing steps possibly causing them to under- or overestimate position uncertainty, or each measurement is explicitly annotated which may be inefficient for a large number of measurements. An example is that a stereo camera position measurement uncertainty of a point strongly varies with the actual position with respect to the sensor, in particular it increases significantly with the distance.

ii) Dense data representations with fixed position resolution sampled on a regular grid in Cartesian coordinates (maps) in U undersample data in regions where the sensor position measurement resolution is higher than the fixed grid resolution, and thus may lose information, or oversample data in regions where the sensor measurement position resolution his lower than the fixed grid resolution and thus unnecessarily increase memory consumption, or both. An example is that a stereo camera position reconstruction has a high resolution at near range and strongly deteriorates for large distances. Fixed grid resolution in sensor coordinates does not take into account this property leading to under- and oversampling for near and distance points, respectively.

iii) Modern high-resolution sensors such as camera or radars provide a high amount of measurements. Keeping all measurements renders following processing inefficient due to the high amount of data. Neglecting measurements a priori might render following processing imprecise when important information is not available.

iv) Furthermore, the position measurement component orthogonal to the considered 2D map, i.e. the height or vertical component, is often not as informative as the other position measurement components. Storing them in full resolution leads to unnecessary high memory consumption without a benefit for following processing. An example is that for obstacle avoidance, instead of storing fine-resolved height information, it is sufficient to keep the binary information whether an object is in a height critical for navigation (cars, pedestrians, walls, . . . ) or not (bridge, traffic sign, . . . with sufficient head room).

Figure 15:
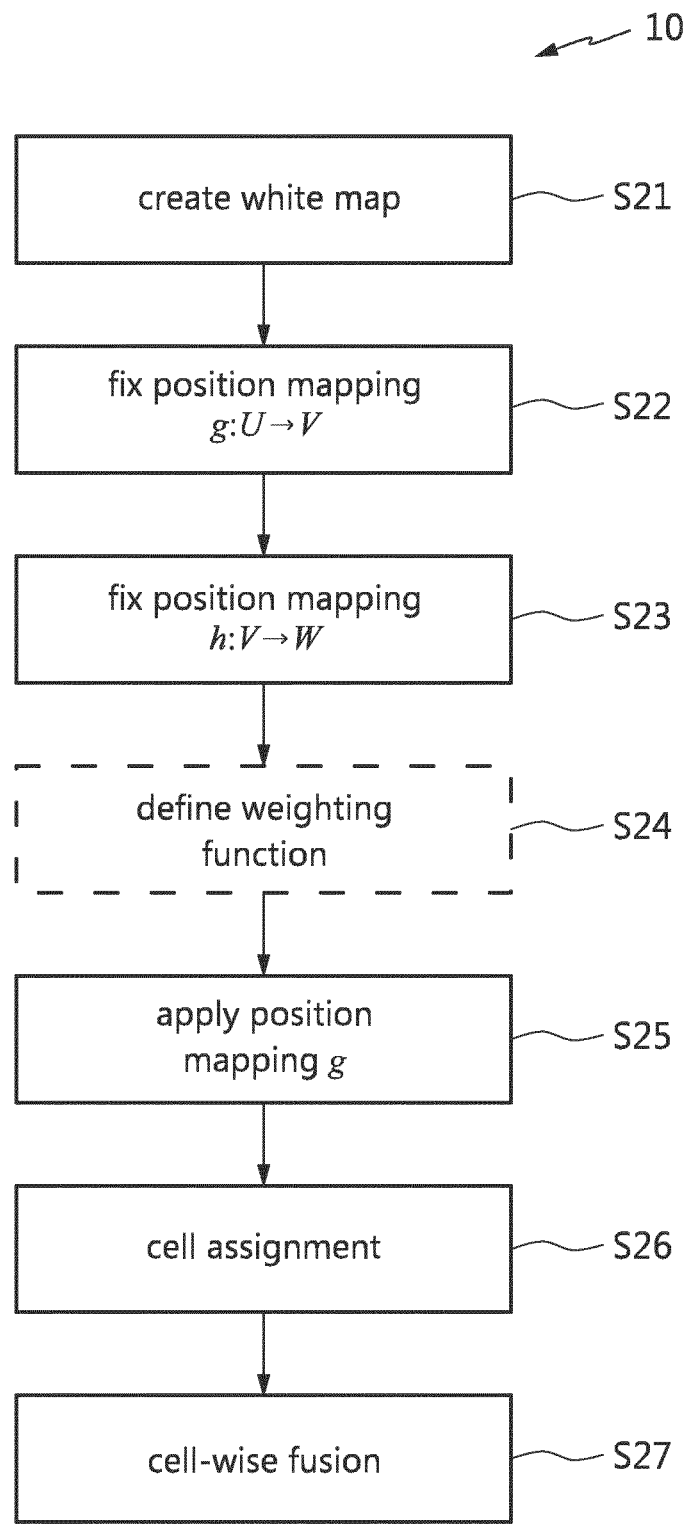
FIG. 15 shows a flow chart of an embodiment of a data transformation method according to the present disclosure.

FIG. 15 shows a flow chart of an embodiment of a data transformation method 20, which may be used in an embodiment of the object detection apparatus and method according to the present disclosure.

In a first step S21 a new data structure, referred to as white map (which may then be used as a feature map), is created which forms a two-dimensional regular grid indexed by (k, l). The domain covered by this grid is denoted as V. Each grid cell is capable of storing an appropriate description of fusing no, one or few complementary measurements. The term "feature" shall hereby be understood generally, which includes complementary measurements and features derived from complementary measurements. The term "feature" is also used as an equivalent of the term "complementary measurement", or "complementary measurements" may also be understood as examples for features.

Hence, in an embodiment a white map is generated from the acquired sensor data of the scene, the white map representing a grid of grid cells, each grid cell storing a position and one or more features at said position. The white map is one possible option to be used as input feature map for the above described embodiments of the object detection apparatus and method, which may be capable of using one or more white maps or other feature maps in addition or instead of white maps as input.

Figure 16:
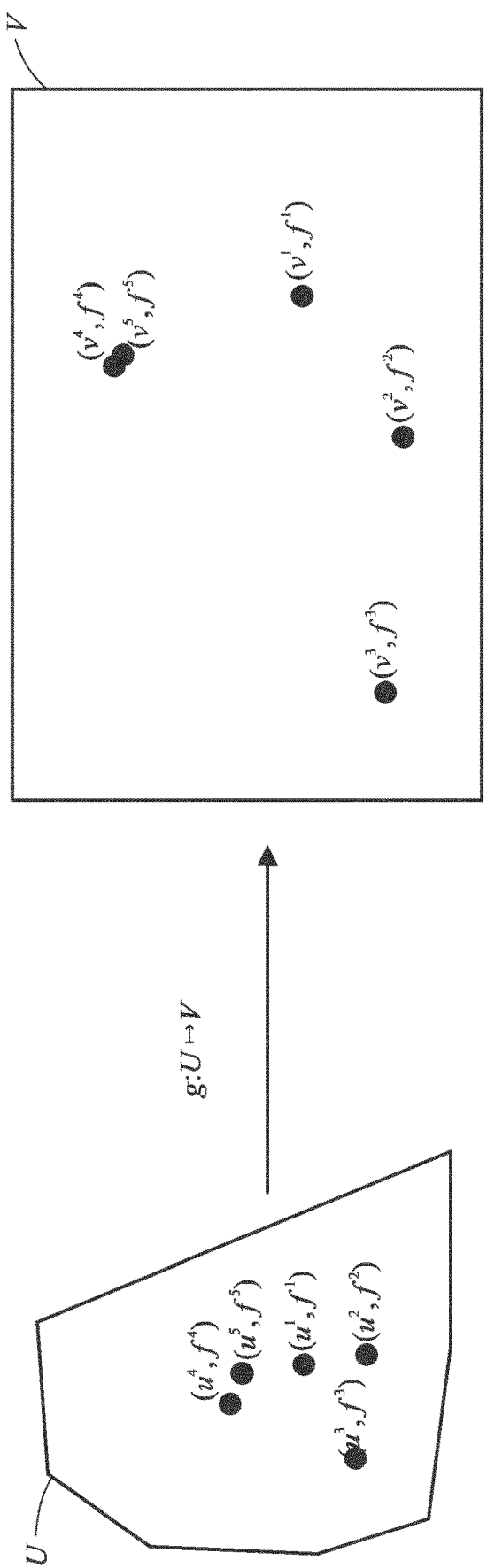
FIG. 16 shows a diagram illustrating the relation of sensor measurement domain and white map domain.

In a second step S22 a coordinate mapping g: U ↦ V is fixed that maps position measurements s in the sensor position domain U to the two-dimensional domain V of the white map. The mapping is chosen such that the position measurement uncertainty is (approximately) identical over the whole domain U of the white map coordinate system. This relates to the whitening transformation known in statistics, thus the name "white map". The relation of sensor measurement domain U and white map domain V is illustrated in FIG. 16.

Hence, in an embodiment a fixed mapping for mapping position measurements obtained from the sensor data to positions in the two-dimensional domain of the white map may be applied, wherein the mapping is chosen to obtain a substantially identical position measurement uncertainty over the two-dimensional domain of the white map. The coordinate mapping may hereby be chosen application-specific and in particular sensor-specific. The suitability of a selected mapping can be checked by verifying that it fulfills the following properties: The position uncertainty in the white may domain must be (approximately) identical over the whole domain and the mapping between sensor and white map domain shall be bijective. The verification can be performed analytically if an error model is available, or experimentally with suitable data sets.

In a third step S23 a further coordinate mapping h: V ↦ W is fixed that maps positions from the white map domain U to 2D coordinates in a map representation of the environment (i.e. of a general coordinate system), e.g. a Cartesian coordinate system.

In an optional fourth step S24 a function w(u, f) may be defined that assigns each measurement a weight used during fusion and in particular allows neglecting non-important measurements.

In a fifth step position measurements $u^j \in U$, j=1, . . . , n, from the sensor coordinate systems are mapped to positions $v_j \in V$ in the white map coordinate system according to the coordinate mapping h defined in step S22.

In a sixth step S26 the complementary measurements $f^j$ are then assigned to the nearest cell $(k^j, l_j)$ of the regular grid in the white map according to their transformed position measurement $v^j$. Alternatively, each measurement may be assigned to several (neighboring) cells and possibly varying impact in the fusion step controlled by w.

Figure 17:
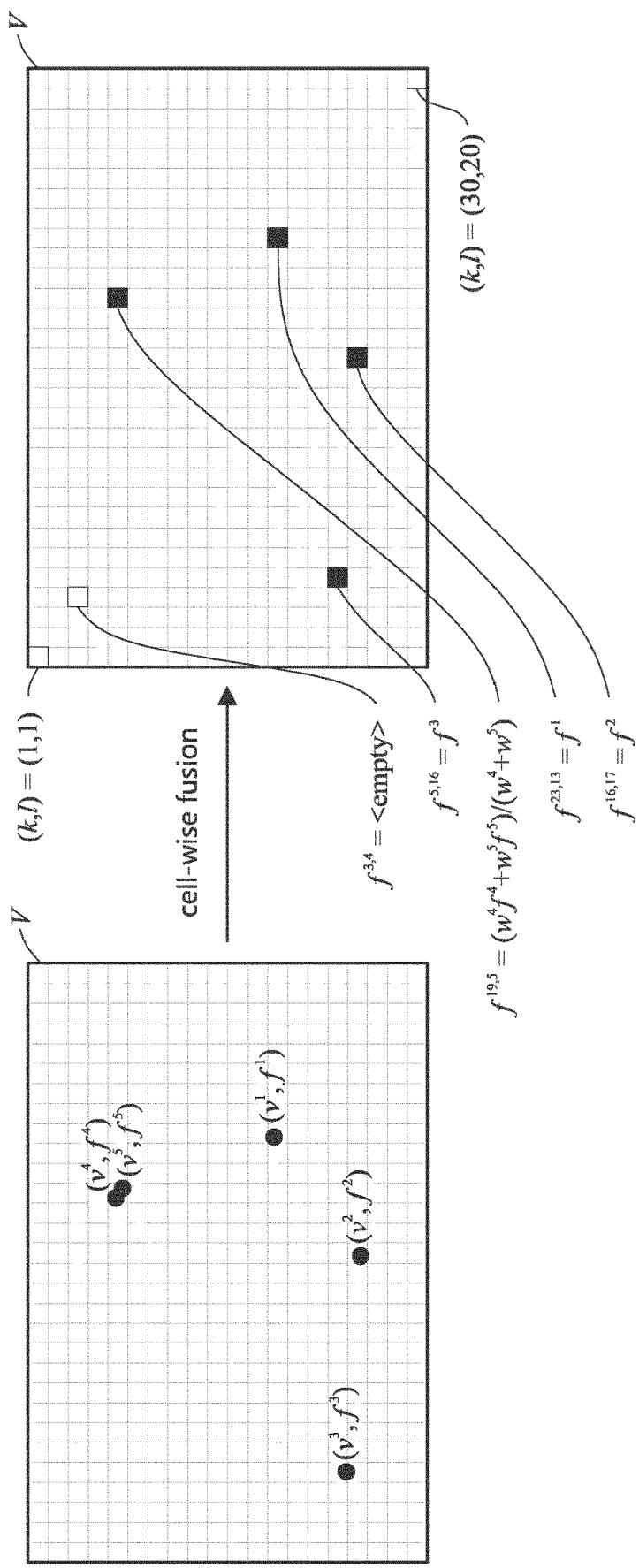
FIG. 17 shows a diagram illustrating an exemplary fusion of measurements transferred to the white map domain.

In a seventh step S27 all transferred complementary measurements $f^j$ assigned to the same cell (k, l) of the white map are then fused, optionally weighted by weighting function w, and stored into the corresponding cell. Cells not assigned any measurement are marked accordingly. An exemplary fusion of measurements transferred to the white map domain is illustrated in FIG. 17.

Figure 18A:
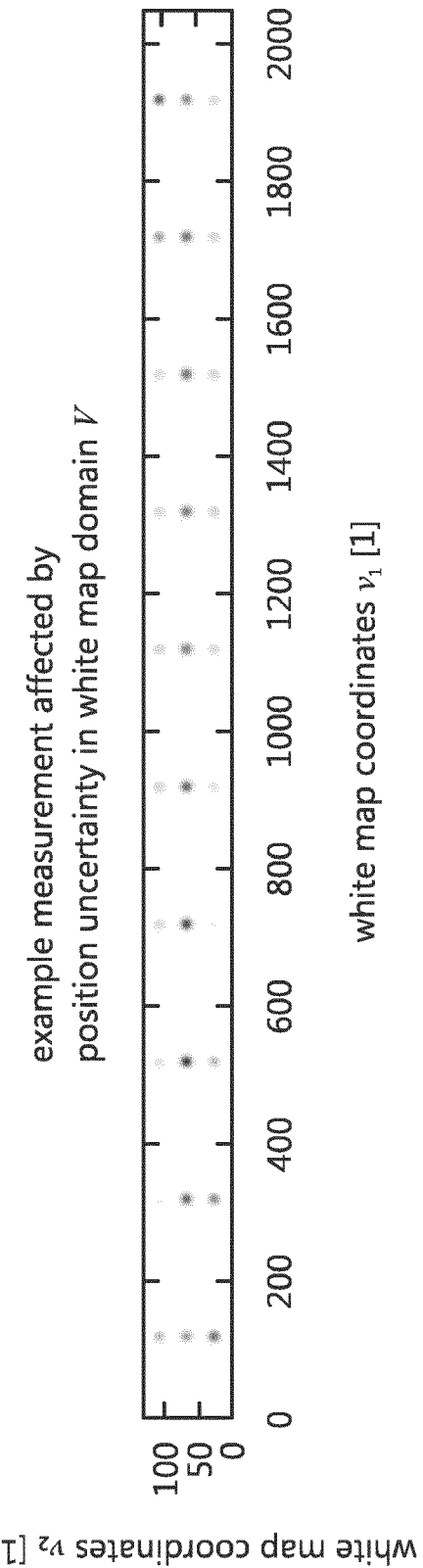
FIG. 18A shows a diagram illustrating exemplary measurements affected by position uncertainty in a white map domain.
Figure 18B:
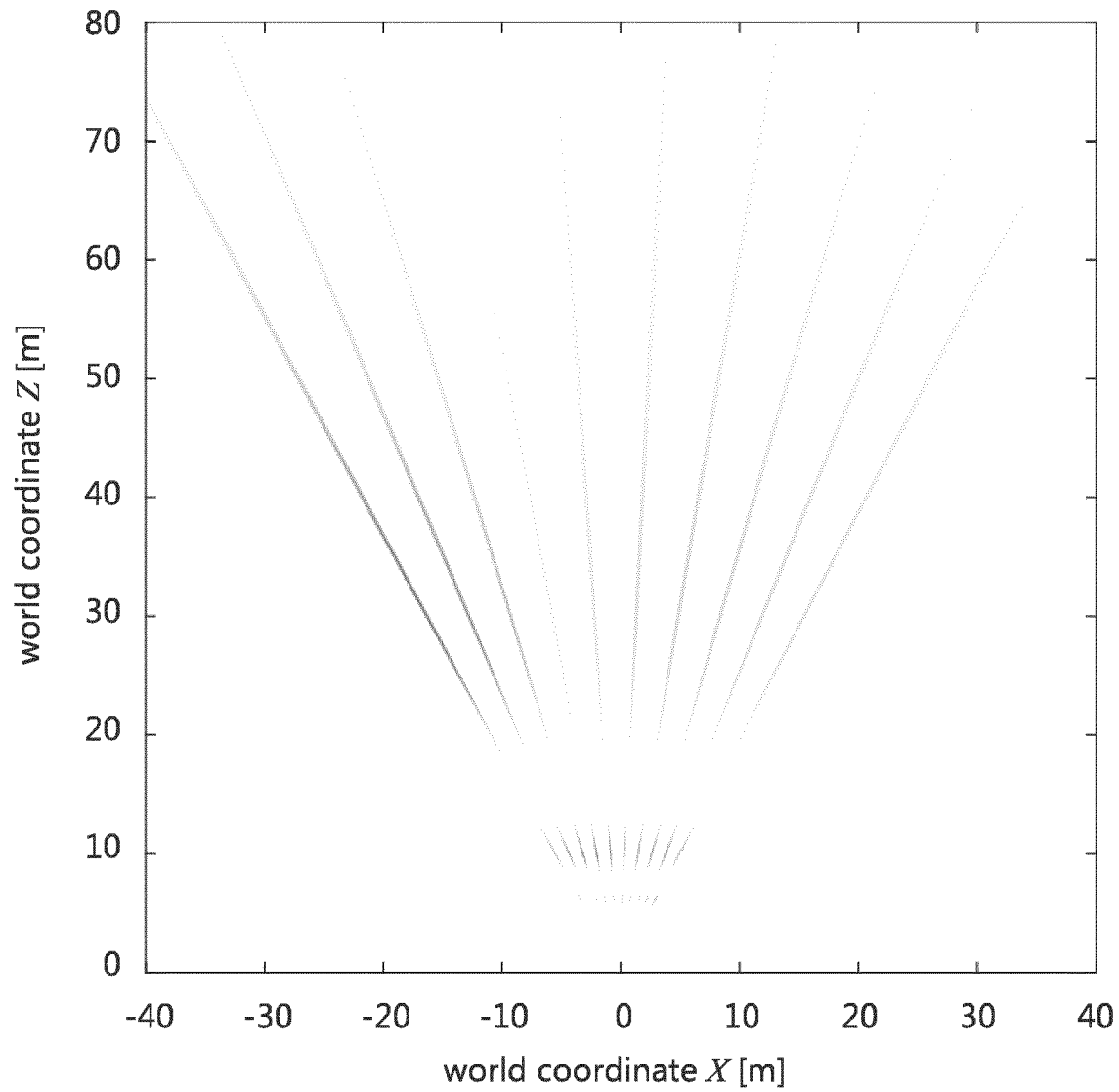
FIG. 18B shows a diagram illustrating exemplary measurements affected by position uncertainty in the world coordinate domain.

FIG. 18 shows exemplary measurements affected by position uncertainty—isotropic normally distributed in white map coordinates—in a white map (FIG. 18A) and in the world coordinate domain (FIG. 18B). The resulting measurements demonstrate that uncertainty in world coordinates is position-dependent, strongly varying and not normally distributed anymore.

Figure 19A:
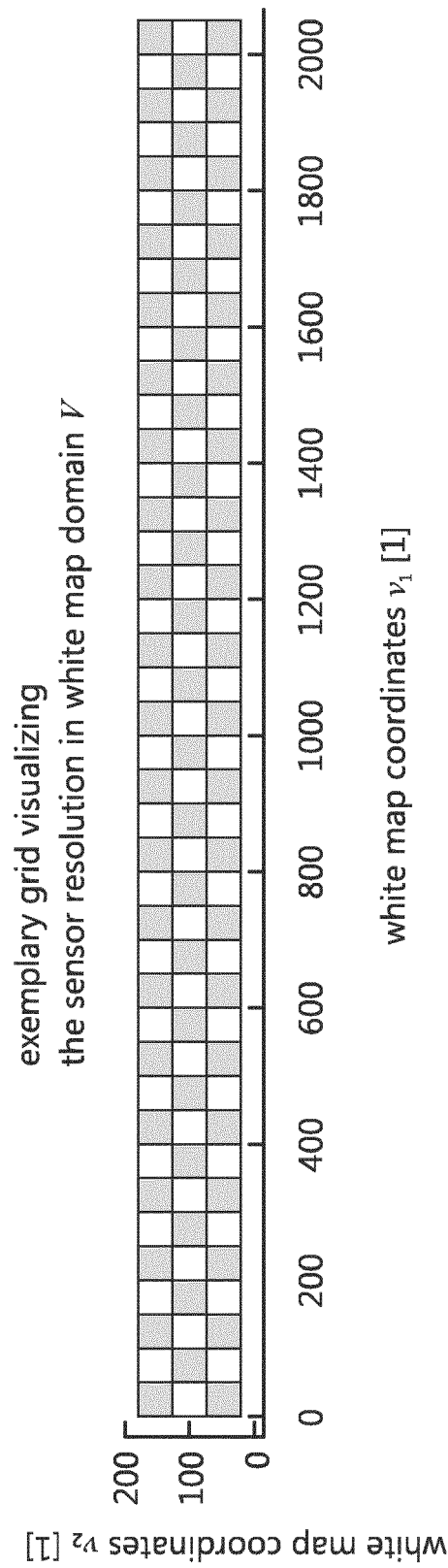
FIG. 19A shows a diagram illustrating a regular grid in white map domain.
Figure 19B:
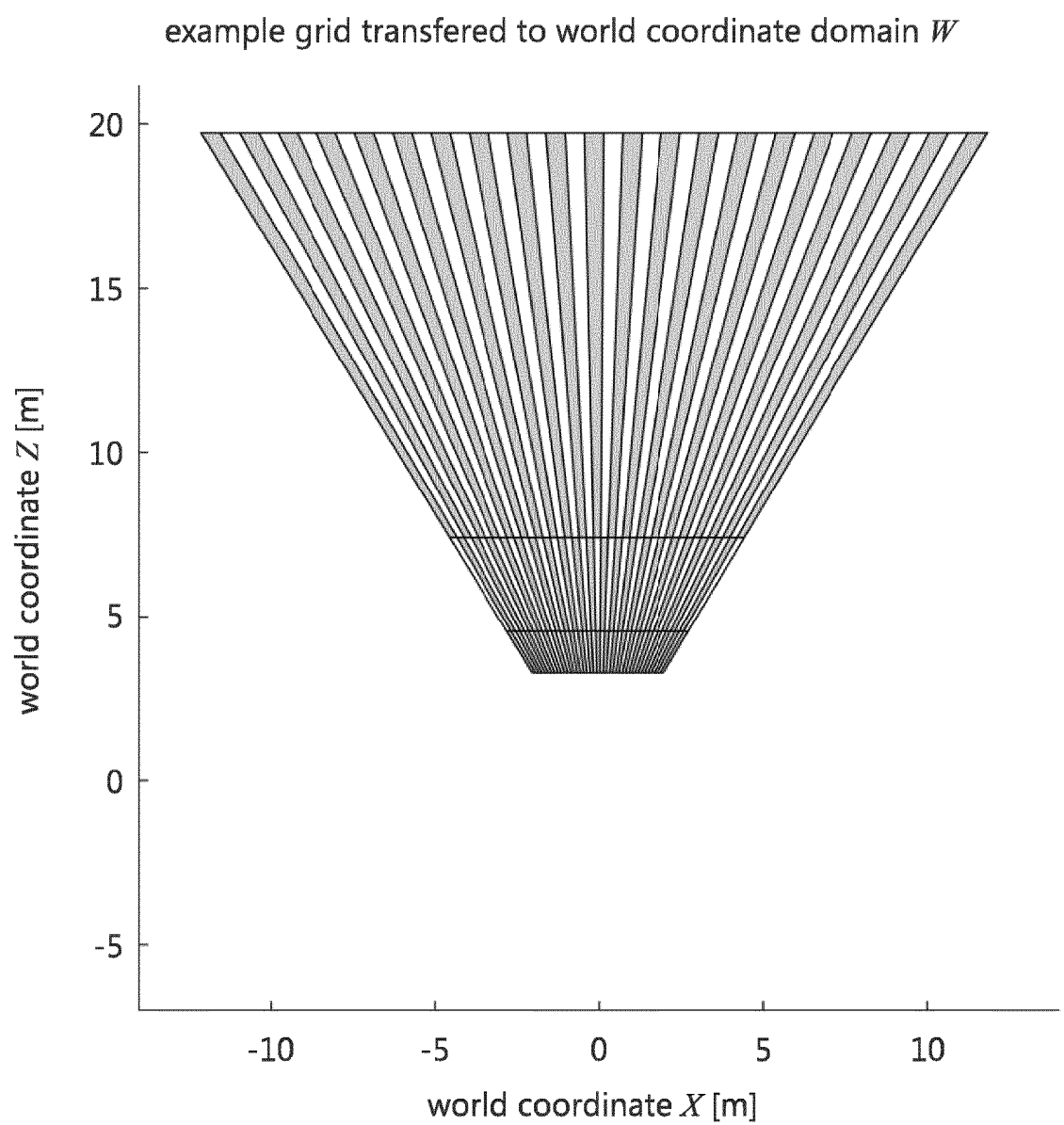
FIG. 19B shows a diagram illustrating a grid transferred to world coordinates.

FIG. 19A shows a regular grid in white map domain representing an exemplary resolution. FIG. 19B shows a grid transferred to world coordinates, demonstrating that resolution is position-dependent and strongly varying in the world coordinates.

Figure 20A:
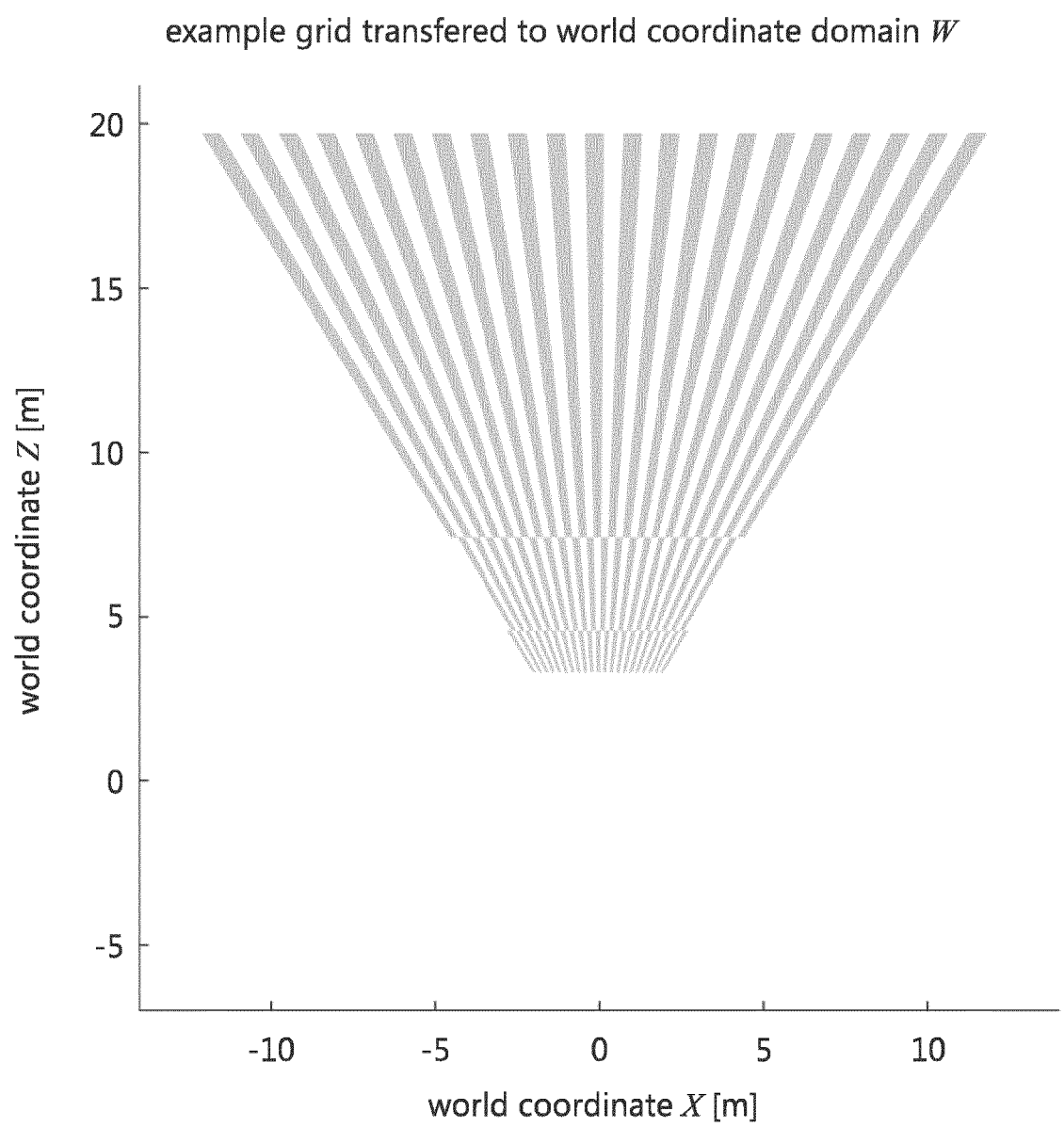
FIG. 20A shows a diagram illustrating a regular grid in white map domain transferred to world coordinates.
Figure 20B:
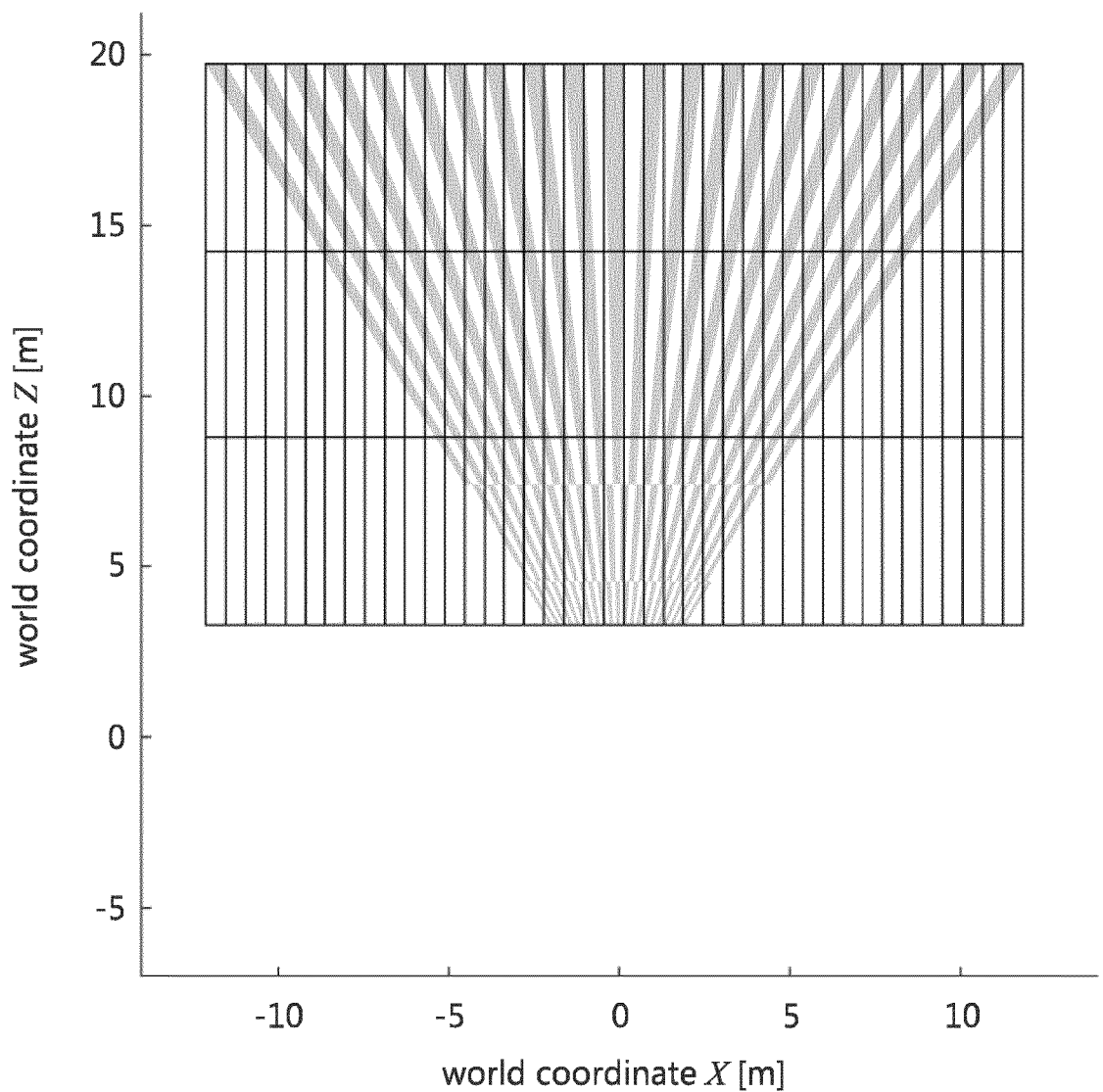
FIGS. 20B-20D show examples for resampling in world coordinates with regular grids with varying spacing.
Figure 20C:
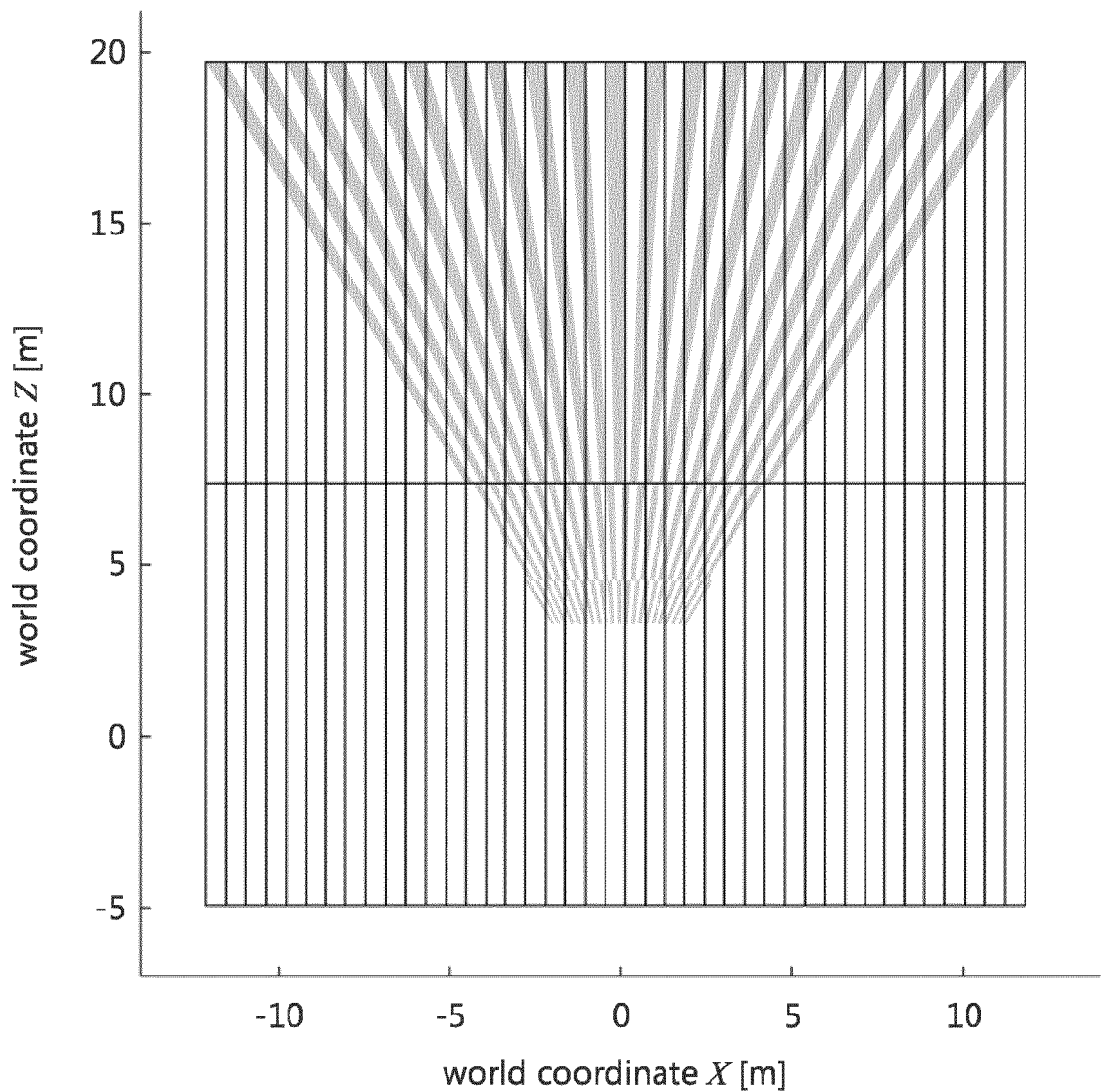
Figure 20D:
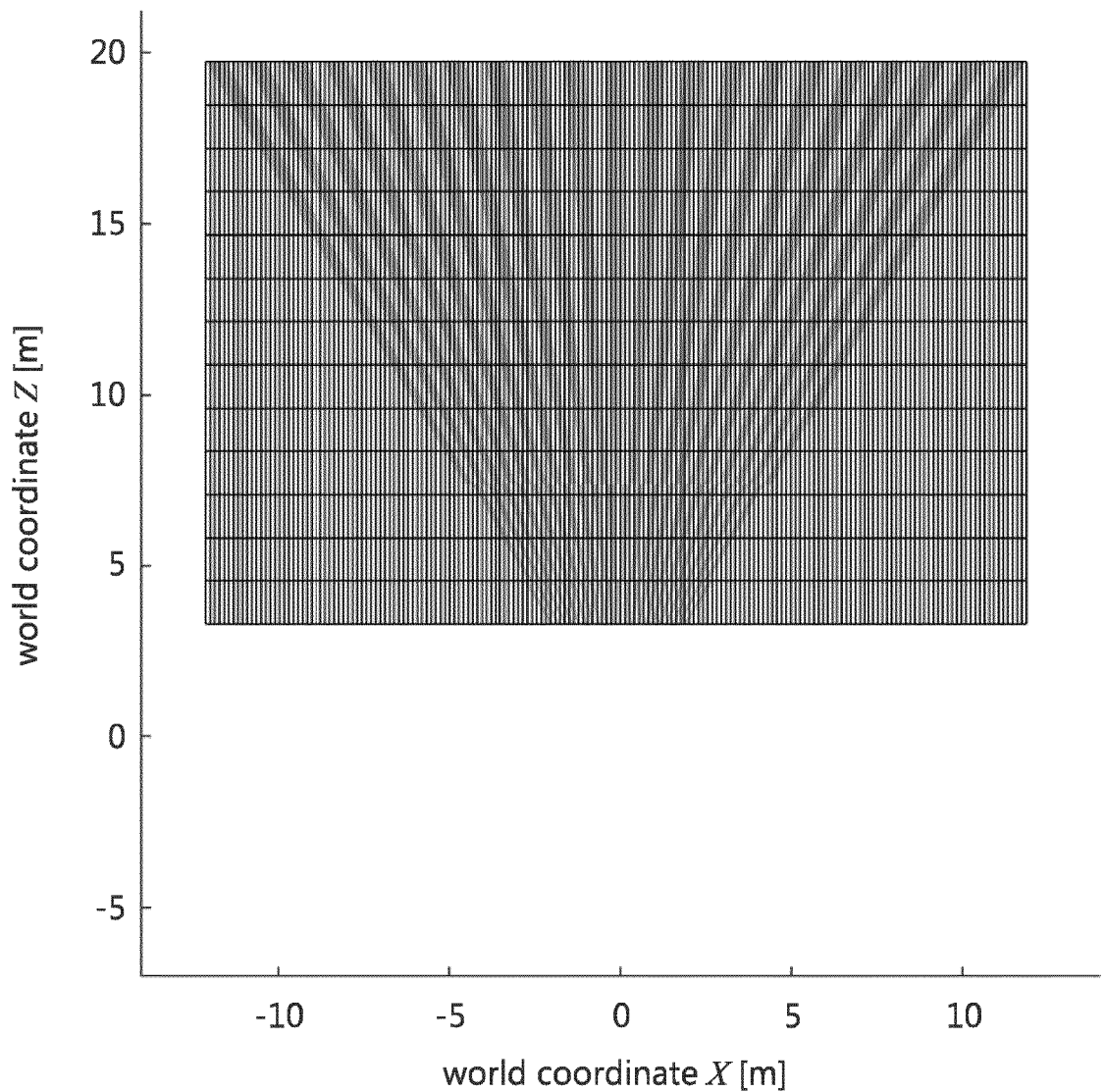
Figure 21A:
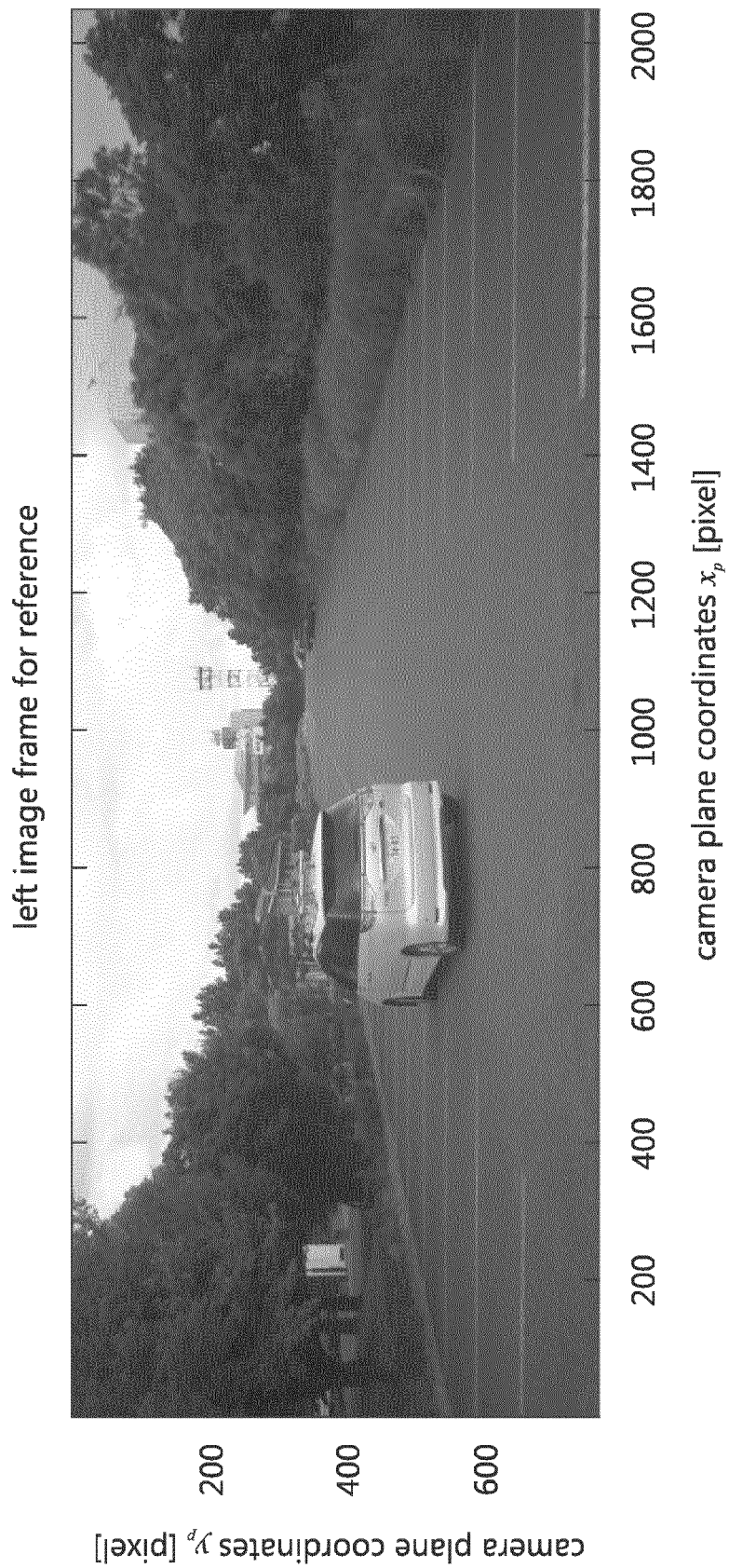
FIG. 21A shows a left image frame for visual reference.
Figure 21B:
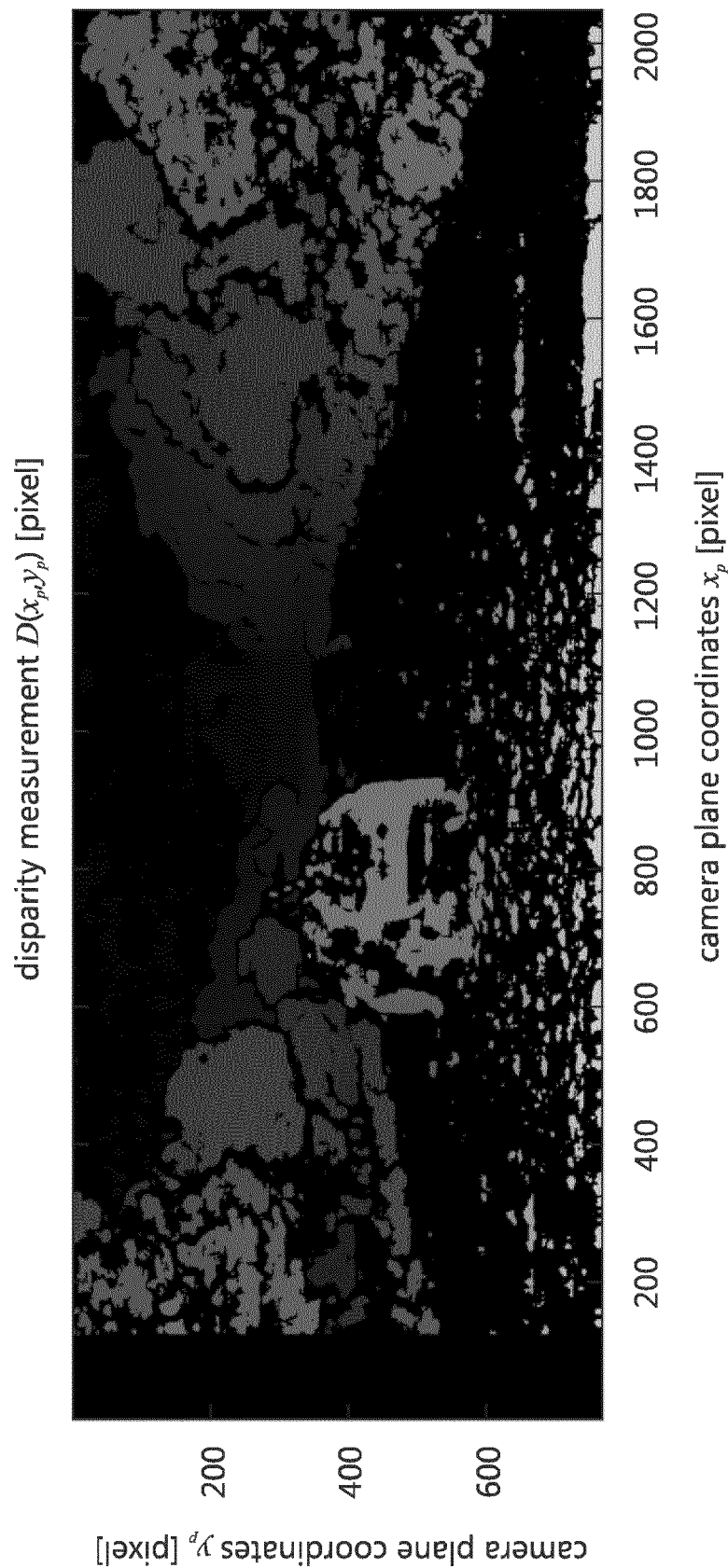
FIG. 21B shows a disparity map measured by a stereo method.
Figure 21C:
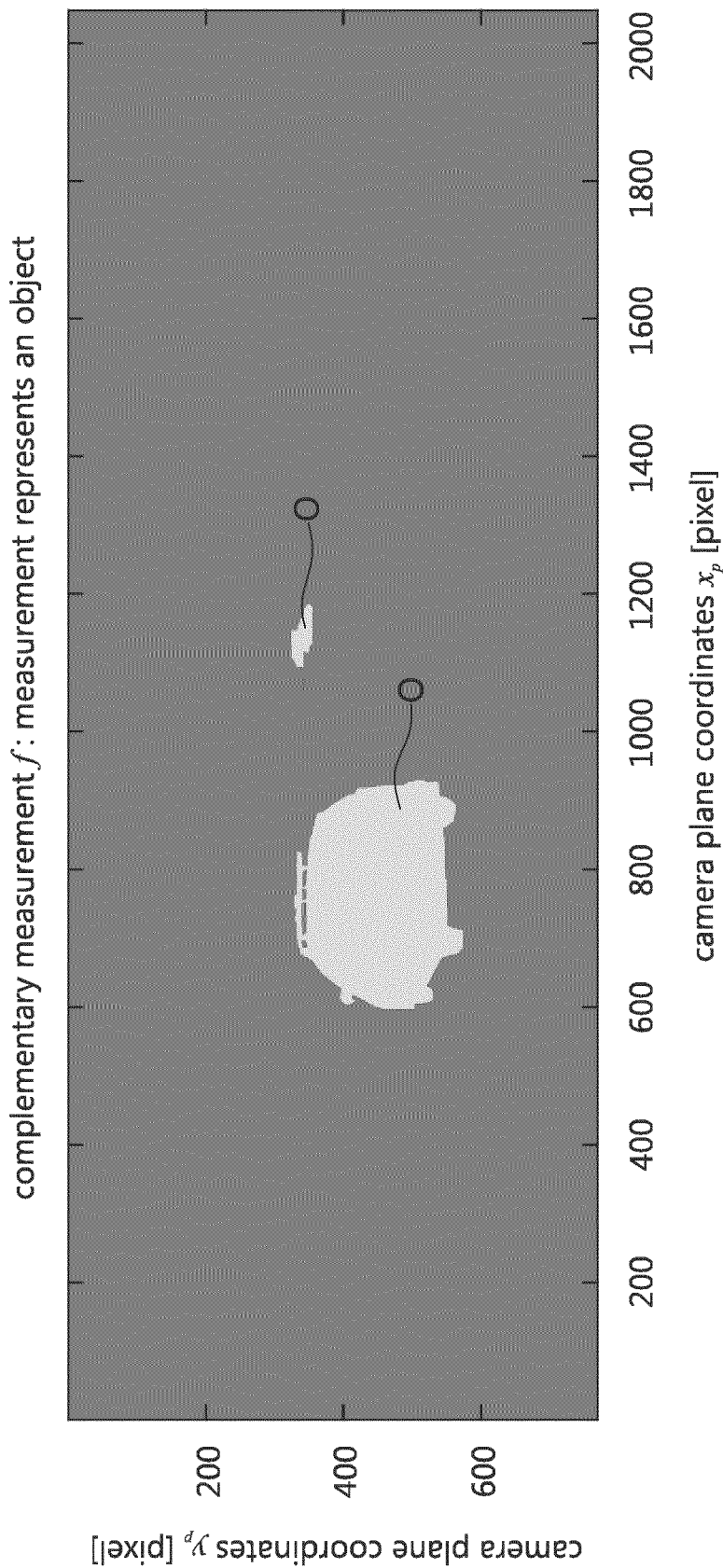
FIG. 21C shows a diagram of a complementary measurement.
Figure 21D:
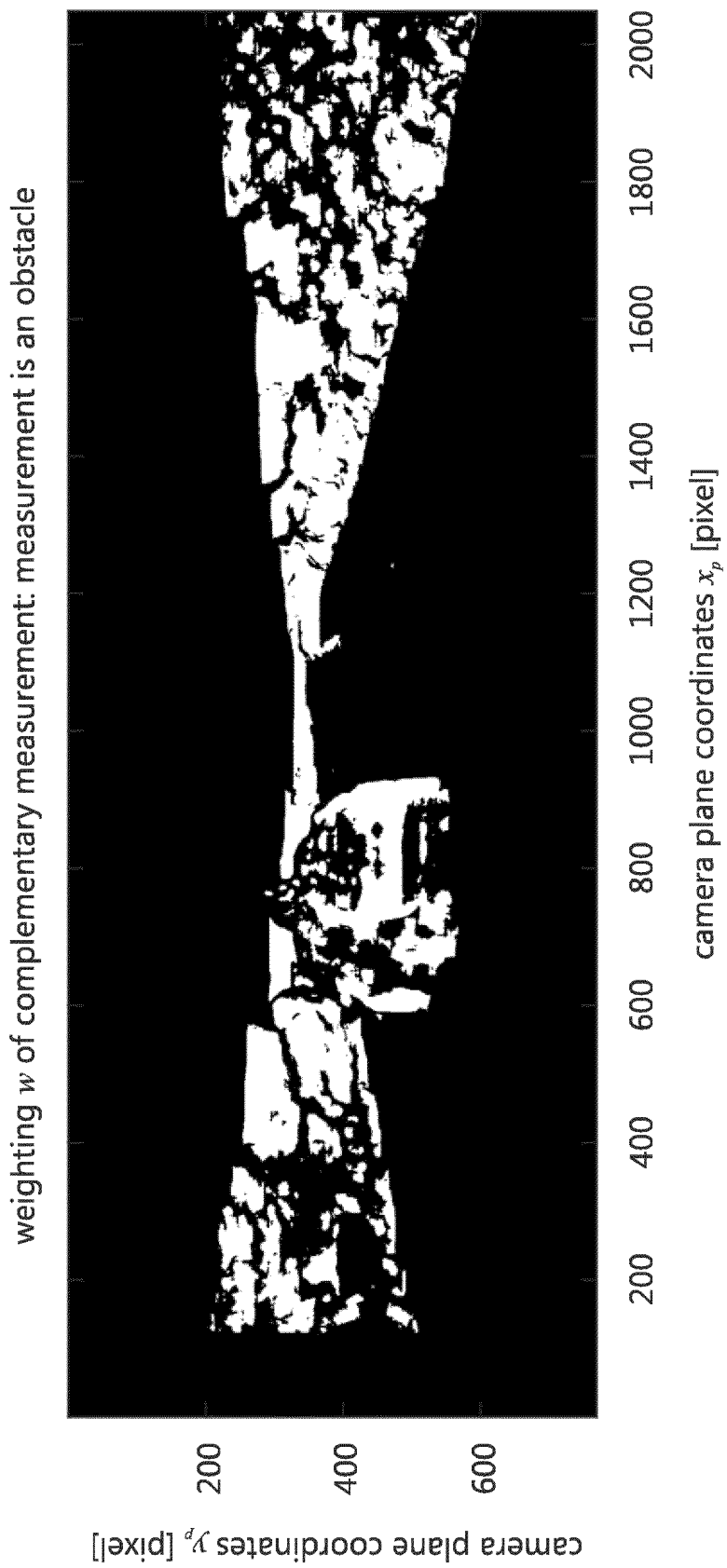
FIG. 21D shows a diagram of an associated weight.

FIG. 20A shows a transferred resolution grid from the above described examples. FIGS. 20B-20D show examples for resampling with regular grids with varying spacing. FIG. 20B shows the same number of cells as input grid, both under- and oversampling for near and far Z, respectively. FIG. 20C shows a grid adapted to original grid resolution for large Z, but undersampling for near Z. FIG. 20D shows a grid adapted to original grid resolution for near Z, but oversampling for far Z.

In the following an example of fusing object existence information from a stereo camera setup will be described. A stereo camera setup provides for each pixel in the left camera a position measurement u=(X, Y, Z)∈U derived from pixel position $x_p$, $y_p$ and measured stereo disparity $$D \text{ as } F(x_p, y_p, D) := \frac{(K_{11}b)}{D} K^{-1} \begin{pmatrix} x_p \\ y_p \\ 1 \end{pmatrix}.$$

Furthermore, a complementary measurement f is provided which is here assumed to be f=1 if in this pixel an obstacle of interest (car or pedestrian) was detected and f=0 otherwise.

The error model for position measurements chosen here assumes that statistic errors in the pixel positions measurements $x_p$ and disparites D are described well by a normal distribution with standard deviation $\sigma_{x_p}$ and $\sigma_D$, and means $x_p$ and D, respectively.

Then the coordinate mapping from U to V is chosen as $$(X, Y, Z) := \begin{pmatrix} \sigma_{x_p}^{-1} & 0 & 0 \\ 0 & 0 & \sigma_D^{-1} \end{pmatrix} F^{-1}(X, Y, Z)$$

with $$F^{-1}(X, Y, Z) = \Pi \left( K \begin{pmatrix} X \\ Y \\ Z \end{pmatrix} \right)$$

-continued and $$\Pi(V) := \begin{pmatrix} V_1/V_3 \\ V_2/V_3 \\ V_3 \end{pmatrix}.$$

Consequently it is obtained $$v = g(u) = g(X, Y, Z) = \begin{pmatrix} \sigma_{x_p}^{-1} & x_p \\ \sigma_D^{-1} & D \end{pmatrix}$$

and the components of v are independently distributed with a standard deviation of 1 independent of X, Y, and Z, as required by step S22 described above.

A regular grid is described for (k, l) in V with grid spacing 1 with $k \in \{k_{min}, k_{min}+1, \ldots, k_{max}\}$, $l \in \{l_{min}, l_{min}+1, \ldots l_{max}\}$ that all relevant D and $x_p$ fall into this range, e.g. $k_{min}=0$, $k_{max}=\text{ceil}((\text{width}-1)\ \sigma_{x_p})$, $l_{min}=0$, and $l_{max}=\text{ceil}((D_{max}-1)\ \alpha_D)$. Here width and $D_{max}$ denote the image width and largest measurable displacement, respectively.

The mapping h(v) from white map to world coordinates as required by step S23 is set to $$h(v) := \begin{pmatrix} 1 & 0 & 0 \\ 0 & 0 & 1 \end{pmatrix} F(\sigma_{x_p} v_1, 0, \sigma_D v_2) = \begin{pmatrix} X \\ Z \end{pmatrix}$$

and thus just transfers v back to the two world coordinates X and Z.

Further, the weighting function w(X, Y, Z) may be chosen to be 1 if the vertical position Y is between 0 (assumed to be the road level) and some head room threshold, here e.g. 3 meters, and 0 otherwise, and the weight is assigned to each measurement.

A measurement mapped to $v=g(x_p, y_p, D)$ is only assigned to one cell given by $(k, l)=(\text{round}(v_1), \text{round}(v_2))$. All complementary measurements $f^1, \ldots, f^m$ assigned to the same cell with weights $w^1, \ldots, w^m$ are fused as a weighted sum: $(\Sigma_{i=1}^{m} w^i f^i)/(\Sigma_{i=1}^{m} w^i)$.

FIG. 21 shows diagrams illustrating some of the steps of the above described example. FIG. 21A shows a left image frame for visual reference. FIG. 21B shows a disparity map measured by a stereo method from a pair of rectified image frames. FIG. 21C shows a complementary measurement indicating the pixel-wise belief that an object of interest (car, pedestrian, bicyclist) is present (indicated by the brighter areas O) based on appearance evaluation. FIG. 21D shows an associated weight indicating that the estimated position is between 0 and 3 meters above the road level and thus considered a relevant obstacle (=white) or not (=black).

Figure 22:
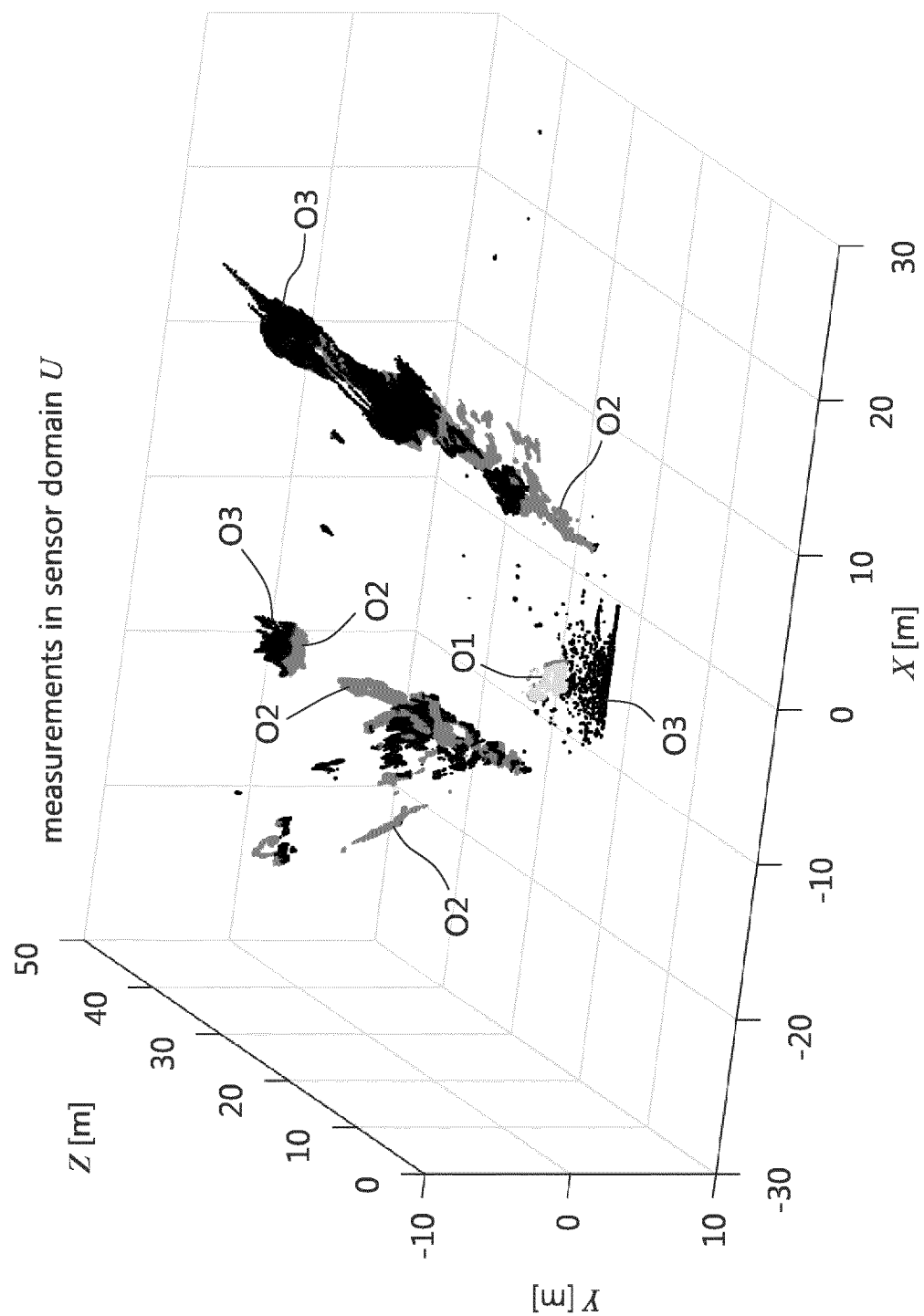
FIG. 22 shows a diagram illustrating point measurements in sensor coordinate domain.

FIG. 22 shows a diagram illustrating point measurements in sensor coordinate domain U. Different brightness indicates the complementary measurement: For instance, areas O1 indicate an object of interest and weight is 1; areas O2 are not an object of interest and weight is 1, and areas O3 are areas where weight is 0.

Figure 23:
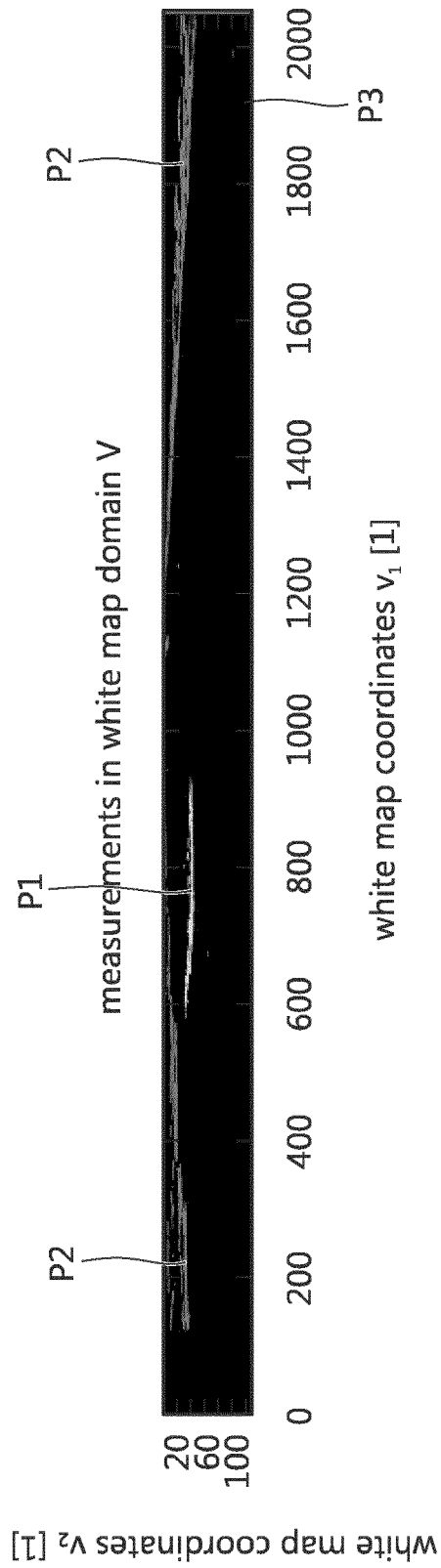
FIG. 23 shows a diagram illustrating measurements transferred and fused in white map domain.

FIG. 23 shows a diagram illustrating measurements transferred and fused in white map domain using a brightness (or color) encoding: Areas P1 indicate that there is a relevant obstacle (0 to 3 m above road) which is identified as an object of interest (e.g. car, pedestrian, bicyclist); areas P2 indicate that there is a relevant obstacle but it is not an object of interest (e.g. traffic sign, house, . . . ); areas P3 indicate areas with no measurements.

By design the disclosed new representation of sensor measurements has the following beneficial properties:

i) Due to the choice of the coordinate mapping g in step S22, the position measurement uncertainty in the white map coordinate system is known and constant over the whole white map domain. It can thus be efficiently encoded by just storing this information centrally for the whole data representation. Consequently, for each white map position, all measurements that are near in sensor domain due to low resolution or noise can be found in a small surrounding which is of constant shape over the whole white map domain. This reduces complexity of algorithms which need to take into account this information for improved precision.

ii) Due to the choice of the coordinate mapping h in step S23 and the transfer to the new data structure in steps S24 and S25, the data is represented with a resolution which is adapted to the position-dependent sensor-specific resolution. This avoids information loss or unnecessary memory consumption due to under- and oversampling, respectively.

iii) All complementary measurements are transferred to one or more cells. Assuming an appropriate fusion strategy, all complementary measurements are conserved in a condensed form while reducing memory consumption.

iv) All measurements positions are projected to a 2D domain due to h, thus removing information on vertical position and with this reducing memory consumption. It is, however, possible to partially conserve the vertical information by appropriately selecting weighting function w or encoding them as feature information.

It shall be noted that it is not an requirement of the object pose estimation method that there is exactly one white map and that the feature maps are represented by white maps. Rather the input to the method is quite general and can be any combination of one or more feature maps, in particular from different sensor type, Further, each feature map can be represented as white map or any other suitable data structure.

In summary, with the disclosed apparatus, system and method an improved way of detecting objects is presented. Resolution is respected better in this way, leading to object detection with an increased preciseness, in shorter time and at lower computational efforts.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. Object detection apparatus comprising circuitry configured to
   obtain one or more feature maps of a measurement space generated from sensor data of a scene, the sensor data including position information and a feature map representing feature values of a feature at a plurality of positions in the measurement space,
   transform the one or more feature maps into a template coordinate system,
   compute a likelihood that the one or more feature maps correspond to an object template and a given candidate object configuration, and
   iteratively compute likelihoods for different candidate object configurations and determine the object configuration with the highest likelihood.
2. Object detection apparatus as defined in any preceding embodiment, wherein the circuitry is further configured to
   obtain two or more feature maps,
   perform the steps of transforming and computing per feature map,
   perform the step of iteratively computing jointly on said two or more feature maps and
   determine the presence and the position and/or orientation of the object within the scene based on the value of the likelihood and an iteratively determined pose parameter.
3. Object detection apparatus as defined in any preceding embodiment, wherein a feature map represents feature values of occupancy, existence of obstacle, classification, appearance, velocity, height measurement, color, texture, shape, surface orientation or material properties as a feature.
4. Object detection apparatus as defined in any preceding embodiment, wherein the circuitry is further configured to compare an object candidate within a transformed feature map to an object template of an object to be detected by use of a signed distance function mapping template coordinates to a scalar signed distance describing the shortest distance of a point to a bounding box of a fixed size and/or indicating whether the point lies within the interior or exterior of the bounding box.
5. Object detection apparatus as defined in embodiment 4, wherein the circuitry is further configured to use the signed distance function to approximate two-dimensional coordinates by a single representative coordinate.
6. Object detection apparatus as defined in any preceding embodiment, wherein the circuitry is further configured to determine a two-dimensional array of bins representing a probabilistic distribution.
7. Object detection apparatus as defined in embodiment 6, wherein the circuitry is further configured to determine the probabilistic distribution by use of a discretization function mapping a feature value of the transformed feature map to a bin of the probabilistic distribution and/or to discretize the signed distance to determine the bin.
8. Object detection apparatus as defined in any preceding embodiment, wherein the circuitry is further configured to determine the presence and the position and/or orientation of the object within the scene from the observations represented as feature maps by solving an optimization or maximization problem maximizing the likelihood that an object candidate within the transformed feature map corresponds to an object template represented by probabilistic distributions.
9. Object detection apparatus as defined in any preceding embodiment, wherein the circuitry is further configured to transform the feature map into the template coordinate system by
   transforming the feature map into a general coordinate system to obtain an intermediate feature map and then
   transforming the intermediate feature map into the template coordinate system to obtain the transformed feature map.
10. Object detection apparatus as defined in any preceding embodiment, wherein the circuitry is further configured to generate the feature map of the measurement space from the acquired sensor data of the scene.
11. Object detection apparatus as defined in any preceding embodiment, wherein the circuitry is further configured to generate a white map from the acquired sensor data of the scene, the white map representing a grid of grid cells, each grid cell storing a position and one or more features at said position, and to use the white map as feature map.
12. Object detection apparatus as defined in embodiment 11, wherein the circuitry is further configured to apply a fixed mapping for mapping position measurements obtained from the sensor data to positions in the two-dimensional domain of the white map, wherein the mapping is chosen to obtain a substantially identical position measurement uncertainty over the two-dimensional domain of the white map.
13. Object detection apparatus as defined in embodiment 11 or 12, wherein the circuitry is further configured to map positions of the white map to positions in a general coordinate system.
14. Object detection apparatus as defined in embodiment 11, 12 or 13, wherein the circuitry is further configured to fuse features by assigning each feature to the one or more nearest grid cells of the grid of the white map according to their transformed position measurement and/or by combining all features assigned to the same cell to a single, representative value.

15. Object detection apparatus as defined in embodiment 14, wherein the circuitry is further configured to weight features when assigning them to the one or more nearest grid cells.

16. Object detection apparatus as defined in any preceding embodiment, wherein the circuitry is further configured to detect the presence and the position and/or orientation of an object within the scene from the one or more feature maps.

17. Object detection system comprising
a sensor configured to acquire sensor data of a scene, the sensor data including position information,
circuitry configured to generate one or more feature maps of a measurement space from the acquired sensor data of the scene, and
an object detection apparatus as defined in any preceding embodiment for determining the object configuration.

18. Object detection method comprising
obtaining one or more feature maps of a measurement space generated from sensor data of a scene, the sensor data including position information and a feature map representing feature values of a feature at a plurality of positions in the measurement space,
transforming the one or more feature maps into a template coordinate system,
computing a likelihood that the one or more feature maps correspond to an object template and a given candidate object configuration, and
iteratively computing likelihoods for different candidate object configurations and determining the object configuration with the highest likelihood.

19. A non-transitory computer-readable recording medium that stores therein a computer program product, which, when executed by a processor, causes the method according to embodiment 18 to be performed.

20. A computer program comprising program code means for causing a computer to perform the steps of said method according to embodiment 18 when said computer program is carried out on a computer.

21. Object detection apparatus comprising circuitry configured to
obtain one or more feature maps of a measurement space generated from sensor data of a scene, the sensor data including position information and a feature map representing feature values of a feature at a plurality of positions in the measurement space,
transform the one or more feature maps into a template coordinate system,
evaluate the likelihood that a candidate object configuration within the transformed feature map corresponds to an object template of an object, of which the configuration shall be determined, to determine the likelihood that the candidate object configuration corresponds to the measurements,
iteratively repeat the step of evaluating the likelihood using differently orientated and/or translated versions of the object template to determine different probabilistic distributions, and
determine the presence and the position and/or orientation of the object within the scene from the different probabilistic distributions.

The invention claimed is:

1. Object detection apparatus comprising circuitry configured to
obtain one or more feature maps of a measurement space generated from sensor data of a scene, the sensor data including position information and a feature map representing feature values regarding presence of a feature at a plurality of positions in the measurement space in a world coordinate system in a world domain,
transform the one or more feature maps from the measurement space into a template coordinate system in a template domain, the template coordinate system being different from the world coordinate system,
iteratively compute a likelihood that the one or more transformed feature maps correspond to an object template and different candidate object configurations including one or more of orientation, position, size, and shape in the template domain, and
determine the candidate object configuration with the highest likelihood as the object configuration.

2. Object detection apparatus as claimed in claim 1, wherein the circuitry is further configured to
obtain two or more feature maps,
perform transforming and computing per feature map,
iteratively computing the likelihood jointly on said two or more feature maps and
determine the presence and the position and/or orientation of the object within the scene based on the value of the likelihood and an iteratively determined pose parameter.

3. Object detection apparatus as claimed in claim 1, wherein a feature map represents feature values of occupancy, existence of obstacle, classification, appearance, velocity, height measurement, color, texture, shape, surface orientation or material properties as a feature.

4. Object detection apparatus as claimed in claim 1, wherein the circuitry is further configured to compare an object candidate within a transformed feature map to an object template of an object to be detected by use of a signed distance function mapping template coordinates to a scalar signed distance describing the shortest distance of a point of the transformed feature map to a bounding box of a fixed size and/or indicating whether the point lies within the interior or exterior of the bounding box.

5. Object detection apparatus as claimed in claim 4, wherein the circuitry is further configured to use the signed distance function to approximate two-dimensional coordinates by a single representative coordinate.

6. Object detection apparatus as claimed in claim 1, wherein the circuitry is further configured to determine a two-dimensional array of bins representing a probabilistic distribution.

7. Object detection apparatus as claimed in claim 6, wherein the circuitry is further configured to determine the probabilistic distribution by use of a discretization function mapping a feature value of the transformed feature map to a bin of the probabilistic distribution and/or to discretize the signed distance to determine the bin.

8. Object detection apparatus as claimed in claim 1, wherein the circuitry is further configured to determine the presence and the position and/or orientation of the object within the scene from the observations represented as feature maps by solving an optimization or maximization problem maximizing the likelihood that an object candidate within the transformed feature map corresponds to an object template represented by probabilistic distributions.

9. Object detection apparatus as claimed in claim 1, wherein the circuitry is further configured to transform the feature map into the template coordinate system by
transforming the feature map into a general coordinate system to obtain an intermediate feature map and then transforming the intermediate feature map into the template coordinate system to obtain the transformed feature map.

10. Object detection apparatus as claimed in claim 1, wherein the circuitry is further configured to generate the feature map of the measurement space from the acquired sensor data of the scene.

11. Object detection apparatus as claimed in claim 1, wherein the circuitry is further configured to generate a white map from the acquired sensor data of the scene, the white map representing a grid of grid cells, each grid cell storing a position and one or more features at said position, and to use the white map as feature map.

12. Object detection apparatus as claimed in claim 11, wherein the circuitry is further configured to apply a fixed mapping for mapping position measurements obtained from the sensor data to positions in the two-dimensional domain of the white map, wherein the mapping is chosen to maintain position measurement uncertainty over the two-dimensional domain of the white map.

13. Object detection apparatus as claimed in claim 11, wherein the circuitry is further configured to map positions of the white map to positions in a general coordinate system.

14. Object detection apparatus as claimed in claim 11, wherein the circuitry is further configured to fuse features by assigning each feature to the one or more nearest grid cells of the grid of the white map according to their transformed position measurement and/or by combining all features assigned to the same cell to a single, representative value.

15. Object detection apparatus as claimed in claim 14, wherein the circuitry is further configured to weight features when assigning them to the one or more nearest grid cells.

16. Object detection apparatus as claimed in claim 1, wherein the circuitry is further configured to detect the presence and the position and/or orientation of an object within the scene from the one or more feature maps.

17. Object detection system comprising
a sensor configured to acquire sensor data of a scene, the sensor data including position information,
circuitry configured to generate one or more feature maps of a measurement space from the acquired sensor data of the scene, and
an object detection apparatus as claimed in claim 1 for determining the object configuration.

18. Object detection method comprising
obtaining one or more feature maps of a measurement space generated from sensor data of a scene, the sensor data including position information and a feature map representing feature values regarding presence of a feature at a plurality of positions in the measurement space in a world coordinate system in a world domain,
transforming the one or more feature maps from the measurement space into a template coordinate system in a template domain, the template coordinate system being different from the world coordinate system,
iteratively computing a likelihood that the one or more transformed feature maps correspond to an object template and different candidate object configurations including one or more of orientation, position, size, and shape in the template domain, and
determining the candidate object configuration with the highest likelihood as the object configuration.

19. A non-transitory computer-readable recording medium that stores therein a computer program product, which, when executed by a processor, causes the method according to claim 18 to be performed.

20. Object detection apparatus as claimed in claim 1, further comprising determining the presence and the positions and/or orientation of the object within the scene based on the likelihoods of the different object configurations.

* * * * *